(12) United States Patent
Matsuura

(10) Patent No.: US 11,099,206 B2
(45) Date of Patent: Aug. 24, 2021

(54) PHYSICAL QUANTITY SENSOR, ELECTRONIC APPARATUS AND VEHICLE

(71) Applicant: SEIKO EPSON CORPORATION, Tokyo (JP)

(72) Inventor: Yoshiyuki Matsuura, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 43 days.

(21) Appl. No.: 16/665,809

(22) Filed: Oct. 28, 2019

(65) Prior Publication Data

US 2020/0132714 A1 Apr. 30, 2020

(30) Foreign Application Priority Data

Oct. 29, 2018 (JP) .............................. JP2018203181

(51) Int. Cl.
*G01P 15/125* (2006.01)

(52) U.S. Cl.
CPC .................. *G01P 15/125* (2013.01)

(58) Field of Classification Search
CPC ..... G01P 15/0802; G01P 15/125; G01P 15/18
See application file for complete search history.

(56) References Cited

U.S. PATENT DOCUMENTS

| | | | | |
|---|---|---|---|---|
| 5,504,356 A * | 4/1996 | Takeuchi | ............ | G01P 15/0802 257/254 |
| 5,591,910 A * | 1/1997 | Lin | ............ | G01P 15/125 200/61.45 R |
| 6,000,280 A * | 12/1999 | Miller | ............ | G01P 15/125 73/105 |
| 6,744,173 B2 * | 6/2004 | Behin | ............ | B81B 3/0021 310/309 |
| 7,258,010 B2 * | 8/2007 | Horning | ............ | H02N 1/008 73/504.14 |
| 7,270,003 B2 * | 9/2007 | Sassolini | ............ | G01C 19/5769 73/514.32 |
| 7,337,671 B2 * | 3/2008 | Ayazi | ............ | B81C 1/00182 73/514.32 |
| 10,338,092 B2 * | 7/2019 | Sakai | ............ | B81B 7/0064 |
| 2003/0210511 A1 * | 11/2003 | Sakai | ............ | G01P 15/125 361/287 |
| 2004/0093946 A1 * | 5/2004 | Kano | ............ | G01P 15/125 73/514.32 |

(Continued)

FOREIGN PATENT DOCUMENTS

| | | |
|---|---|---|
| JP | 2006105698 | 4/2006 |
| JP | 5678442 | 3/2015 |
| JP | 2017067579 | 4/2017 |

*Primary Examiner* — David J Bolduc
(74) *Attorney, Agent, or Firm* — Workman Nydegger

(57) ABSTRACT

The physical quantity sensor includes a substrate of which thickness direction is in the direction along the Z axis, and a sensor element provided on the substrate to detect a physical quantity, wherein the sensor element includes a movable part which is displaced in a direction along the X axis that is an axis for measuring the physical quantity with respect to the substrate, and a fixed electrode fixed to the substrate, and the movable part includes a movable electrode disposed to face the fixed electrode in the direction along the X axis, and a mass portion that supports the movable electrode and has a longer length than the movable electrode in a direction along the Z axis.

12 Claims, 20 Drawing Sheets

(56) References Cited

U.S. PATENT DOCUMENTS

| | | | |
|---|---|---|---|
| 2004/0187571 A1* | 9/2004 | Goto | G01P 15/125 |
| | | | 73/504.14 |
| 2005/0132804 A1* | 6/2005 | Park | G01P 15/125 |
| | | | 73/514.32 |
| 2007/0214891 A1* | 9/2007 | Robert | G01P 15/18 |
| | | | 73/514.32 |
| 2008/0150554 A1* | 6/2008 | Wang | G01P 15/18 |
| | | | 324/686 |
| 2008/0192406 A1* | 8/2008 | Despesse | H01G 5/16 |
| | | | 361/277 |
| 2009/0199637 A1* | 8/2009 | Sugiura | G01P 15/18 |
| | | | 73/514.32 |
| 2010/0242606 A1* | 9/2010 | Kanemoto | G01P 15/0802 |
| | | | 73/514.38 |
| 2010/0244160 A1 | 9/2010 | Kanemoto | |
| 2011/0049653 A1* | 3/2011 | Kanemoto | G01P 15/18 |
| | | | 257/417 |
| 2011/0120221 A1* | 5/2011 | Yoda | G01P 15/125 |
| | | | 73/514.32 |
| 2011/0296917 A1* | 12/2011 | Reinmuth | G01B 7/085 |
| | | | 73/514.32 |
| 2016/0204716 A1* | 7/2016 | Suzuki | B81B 3/0054 |
| | | | 359/230 |
| 2017/0003314 A1* | 1/2017 | Waters | G01P 15/097 |
| 2017/0345948 A1* | 11/2017 | Sugimoto | G01P 15/18 |
| 2018/0156839 A1* | 6/2018 | Tanaka | B60G 17/01941 |
| 2018/0156840 A1* | 6/2018 | Kigure | G05D 1/0891 |
| 2018/0275159 A1 | 9/2018 | Kanamaru et al. | |
| 2018/0292210 A1* | 10/2018 | Kihara | G01C 19/5656 |
| 2019/0162750 A1* | 5/2019 | Tanaka | G01P 15/097 |
| 2019/0162754 A1* | 5/2019 | Tanaka | G01P 15/18 |

* cited by examiner

PHYSICAL QUANTITY SENSOR, ELECTRONIC APPARATUS AND VEHICLE The present application is based on, and claims priority from JP Application Serial Number 2018-203181, filed Oct. 29, 2018, the disclosure of which is hereby incorporated by reference herein in its entirety.

BACKGROUND

1. Technical Field

The present disclosure relates to a physical quantity sensor, an electronic apparatus, and a vehicle.

2. Related Art

The physical quantity sensor described in JP-A-2017-67579 is an acceleration sensor capable of measuring an acceleration, and includes a substrate and a device substrate fixed to the substrate. Further, the device substrate includes a fixed portion fixed to the substrate, a movable part connected to the fixed portion through a spring and displaceable in a rotational direction with respect to the substrate, a movable electrode finger provided on the movable part, and a fixed electrode finger fixed to the substrate and disposed to face the movable electrode finger. In the physical quantity sensor having such a configuration, when the acceleration is experienced, the movable part is displaced in the rotational direction, and the experienced acceleration can be measured based on a change in electrostatic capacitance between the movable electrode finger and the fixed electrode finger according to the displacement.

As a method of increasing the measurement sensitivity for acceleration, there is a method of increasing the mass of a movable body that is moved when experiencing an acceleration, that is, a movable portion including a movable part and a movable electrode finger, and as a method of increasing the mass of the movable body, there is a method of thickening the device substrate. However, when the thickness of the device substrate is uniformly increased over the entire region, the movable electrode finger and the fixed electrode finger are also increased in thickness, and the viscous resistance between the movable electrode finger and the fixed electrode finger is increased, resulting in increased damping of the movable electrode finger. Therefore, the enhancement of the measurement sensitivity resulting from the increased mass of the movable body is compromised by the increased damping of the movable electrode finger, and the measurement sensitivity cannot be effectively increased.

SUMMARY

A physical quantity sensor according to an aspect of the present disclosure includes, when three axes orthogonal to one another are taken as an X axis, a Y axis, and a Z axis, a substrate of which thickness direction is in a direction along the Z axis, and a sensor element provided on the substrate to detect a physical quantity, in which the sensor element includes a movable part which is displaced in a direction along the X axis that is an axis for measuring the physical quantity with respect to the substrate, and a fixed electrode fixed to the substrate, and the movable part includes a movable electrode disposed to face the fixed electrode in the direction along the X axis, and a mass portion that supports the movable electrode and has a longer length than the movable electrode in the direction along the Z axis.

DESCRIPTION OF EXEMPLARY EMBODIMENTS

Hereinafter, a physical quantity sensor, an electronic apparatus, and a vehicle according to the present disclosure will be described in detail based on embodiments shown in the accompanying drawings.

First Embodiment

Figure 1:
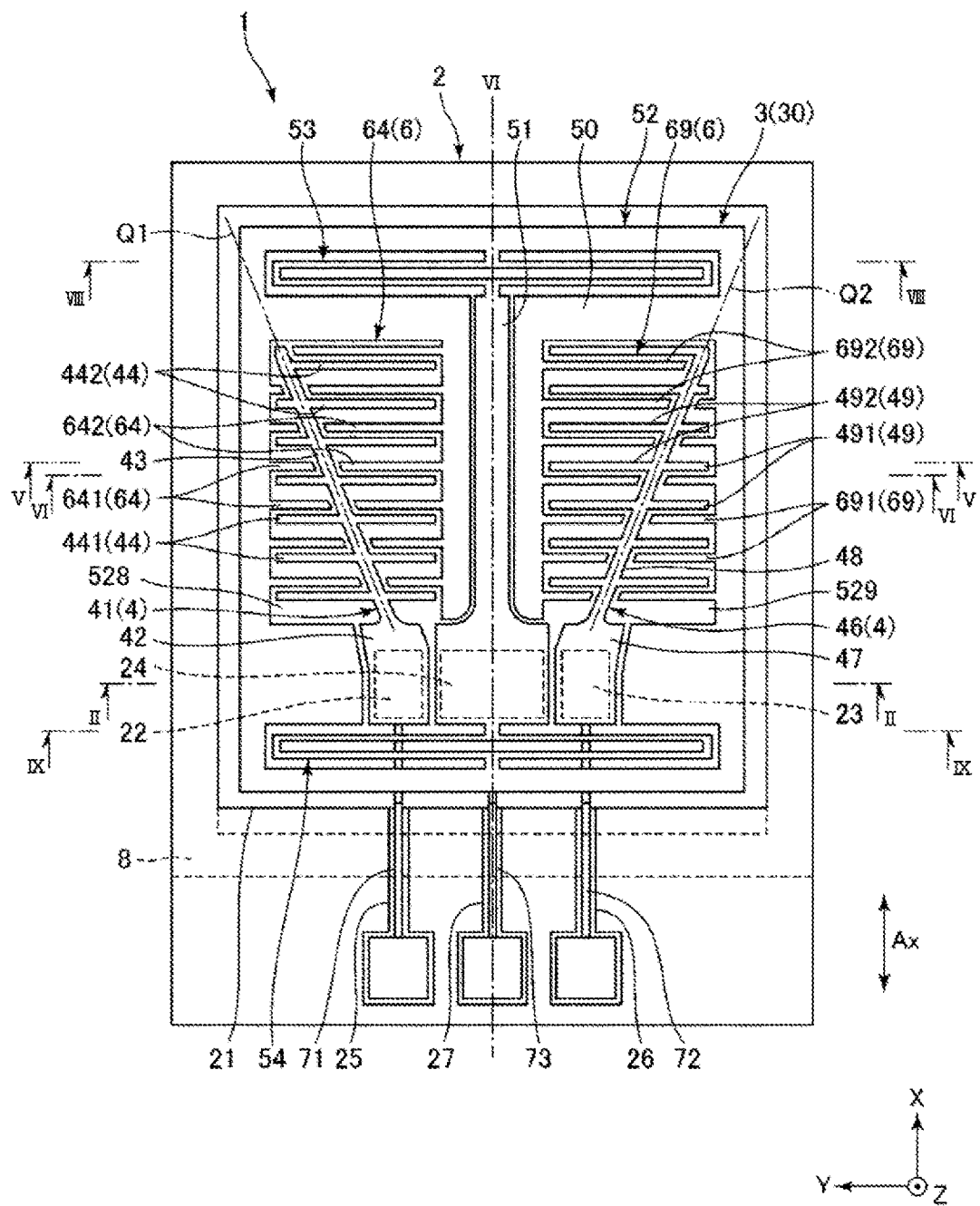
FIG. 1 is a plan view showing a physical quantity sensor according to a first embodiment of the present disclosure.
Figure 2:
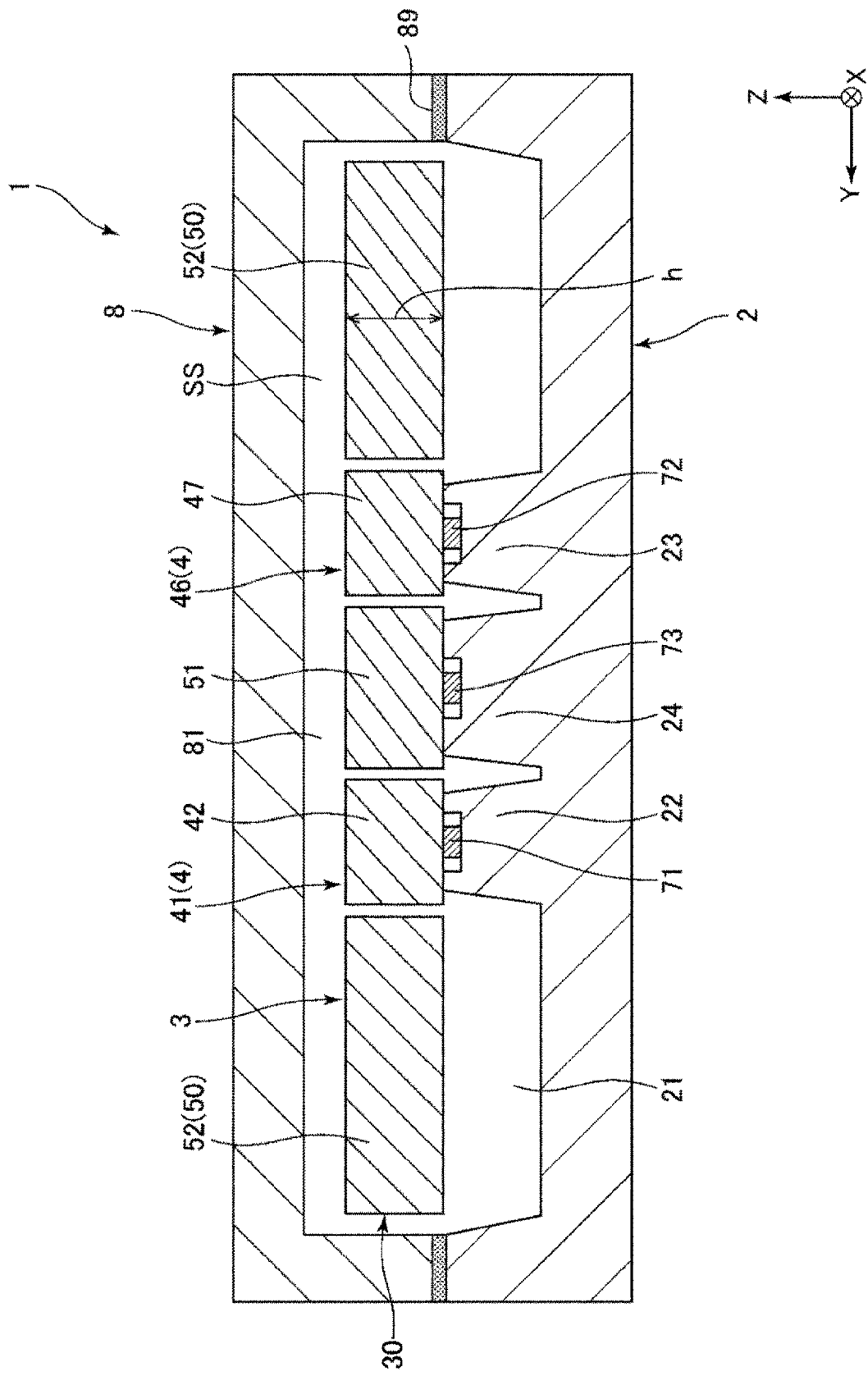
FIG. 2 is a cross-sectional view taken along the line II-II in FIG. 1.
Figure 3:
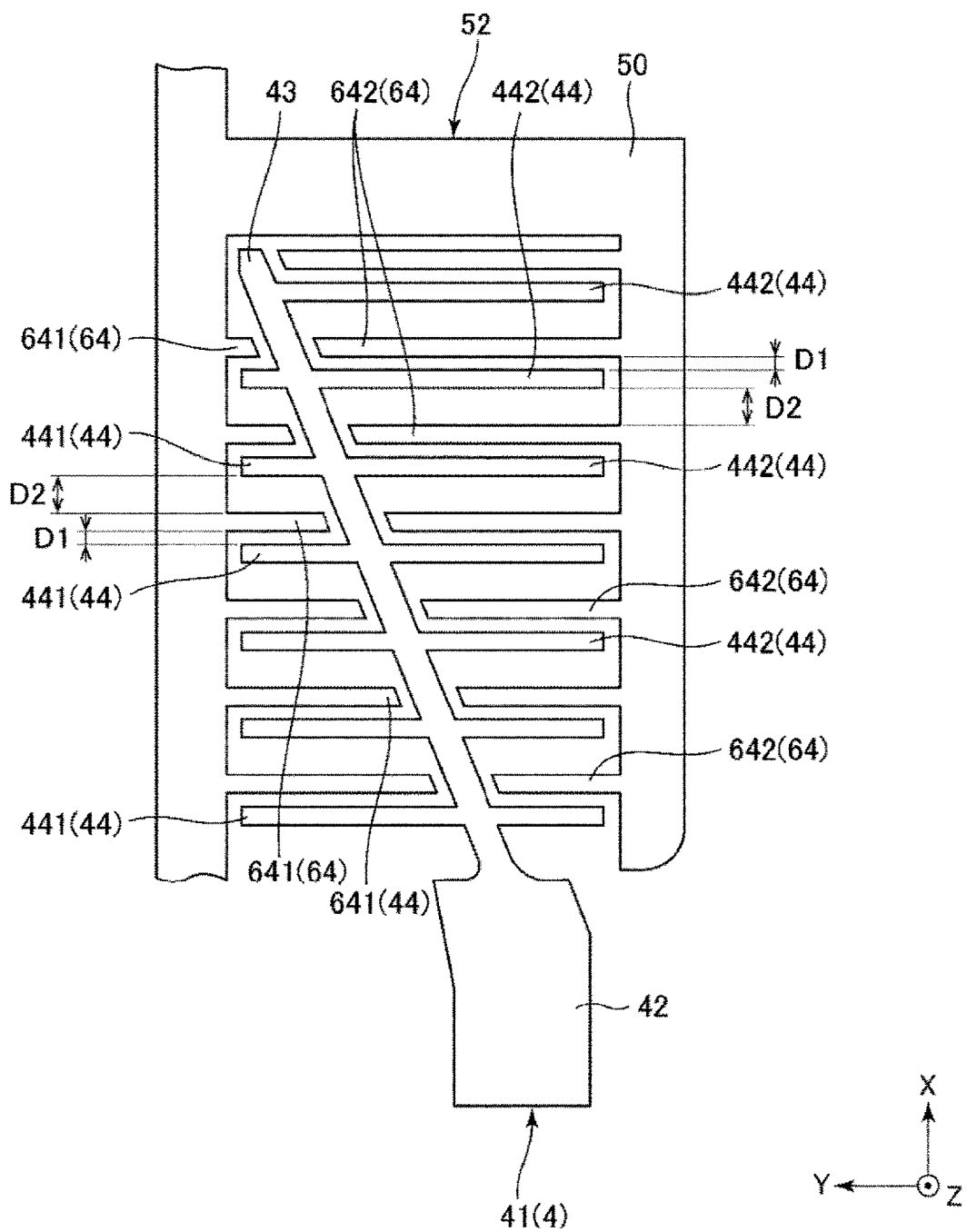
FIG. 3 is a plan view showing a first movable electrode finger and a first fixed electrode finger.
Figure 4:
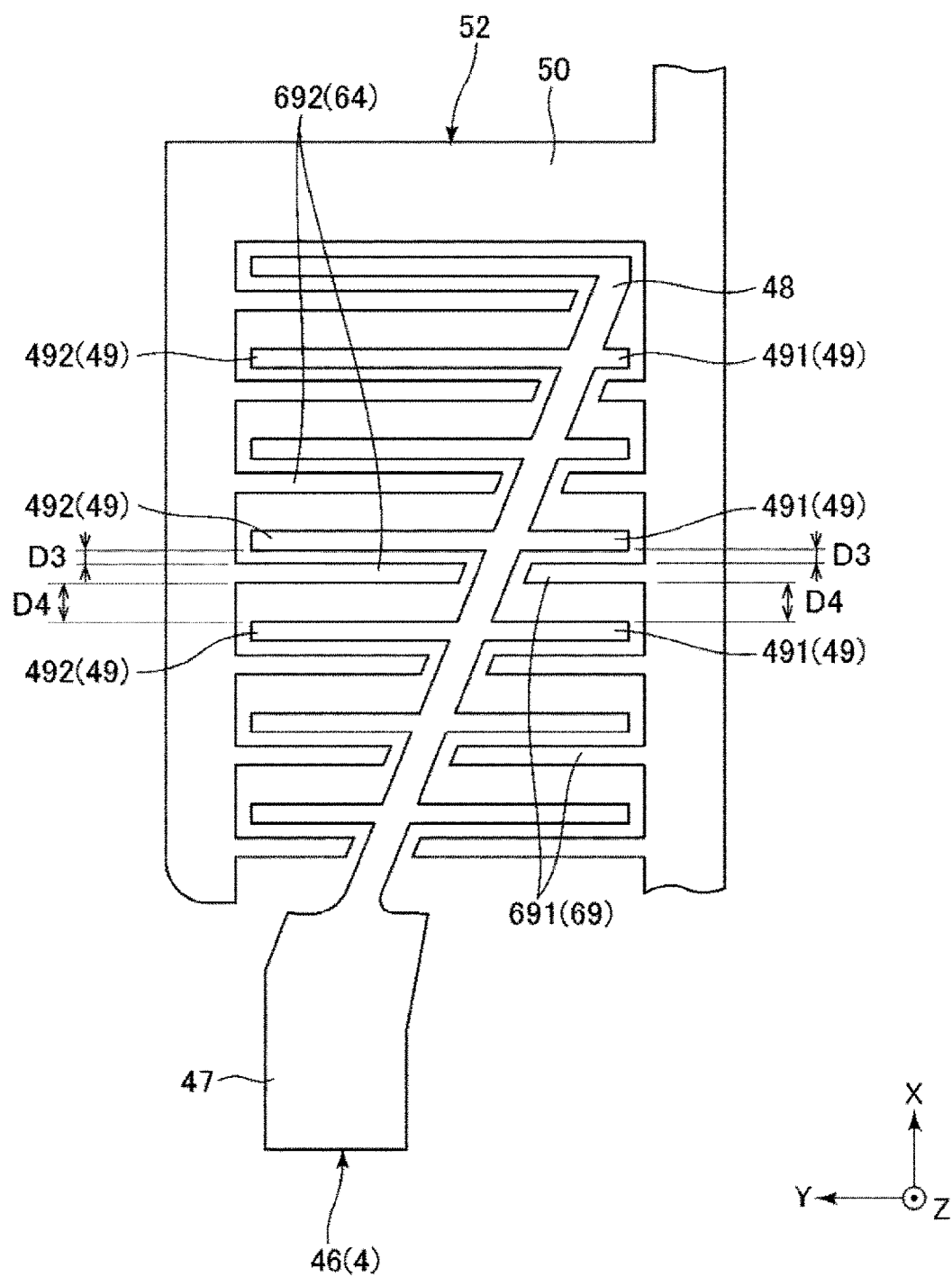
FIG. 4 is a plan view showing a second movable electrode finger and a second fixed electrode finger.
Figure 5:
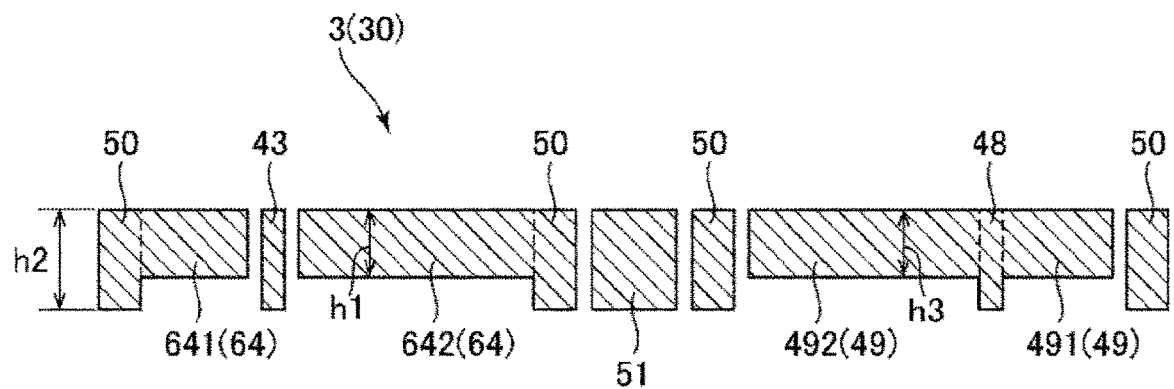
FIG. 5 is a cross-sectional view taken along the line V-V in FIG. 1.
Figure 6:
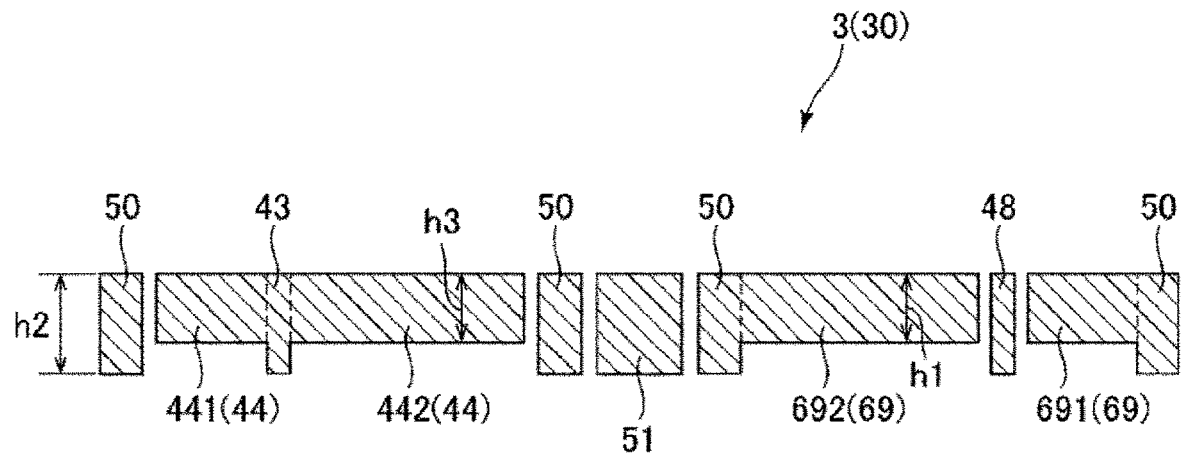
FIG. 6 is a cross-sectional view taken along the line VI-VI in FIG. 1.
Figure 7:
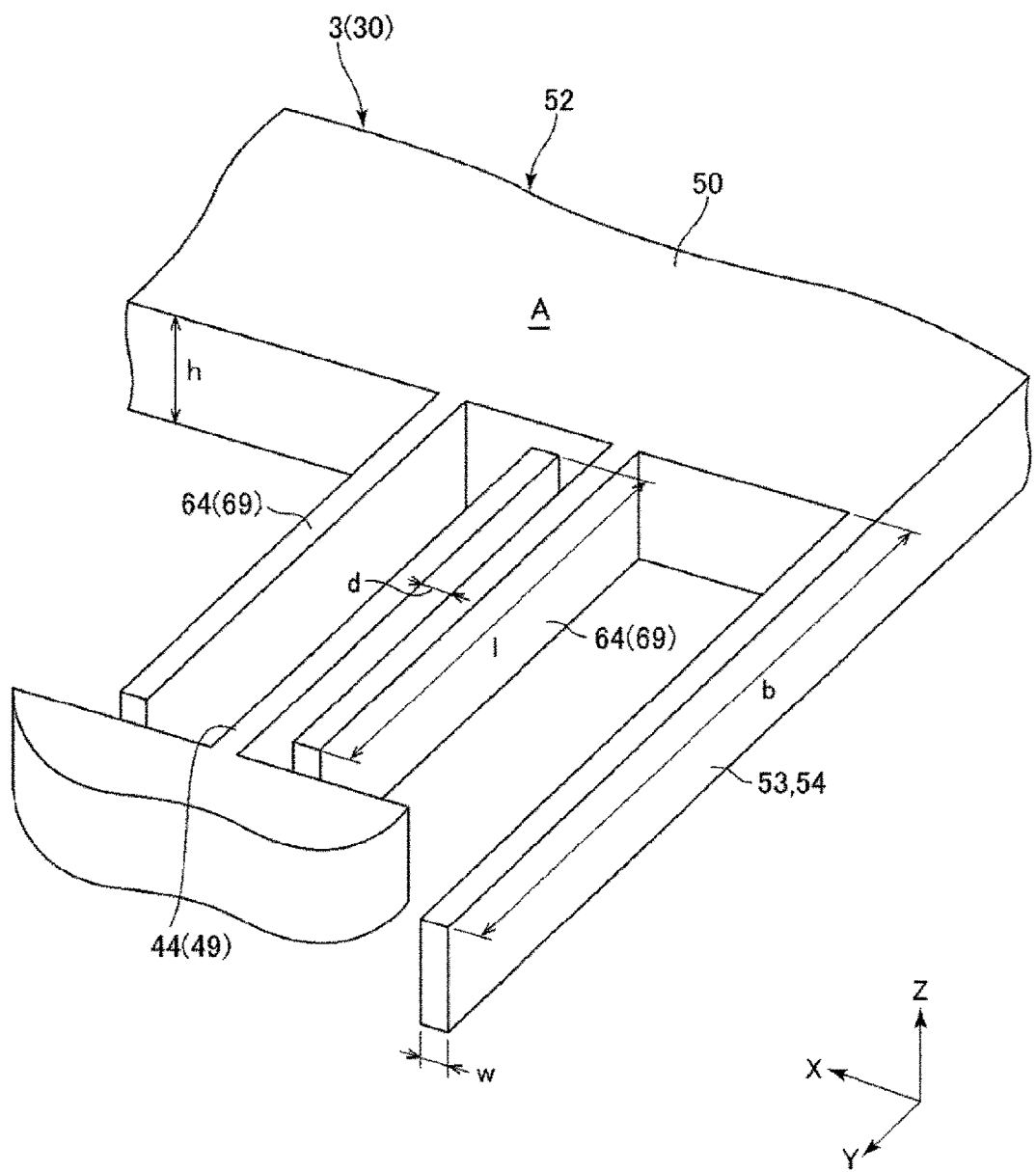
FIG. 7 is a perspective view showing a model used for describing the effect of the present disclosure.
Figure 8:
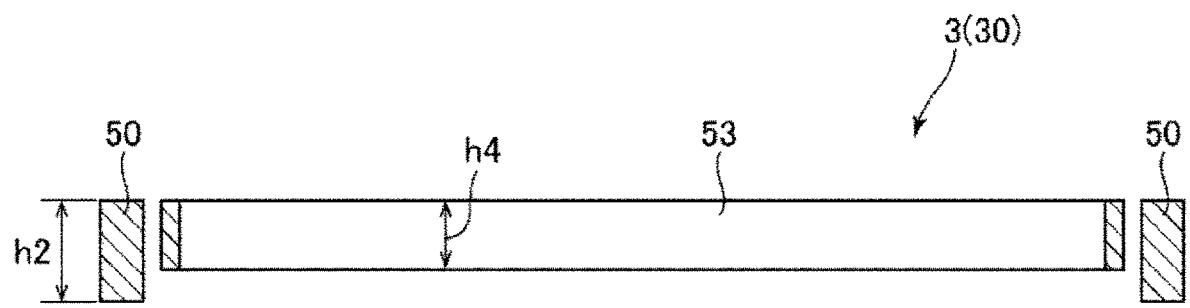
FIG. 8 is a cross-sectional view taken along the line VIII-VIII in FIG. 1.
Figure 9:
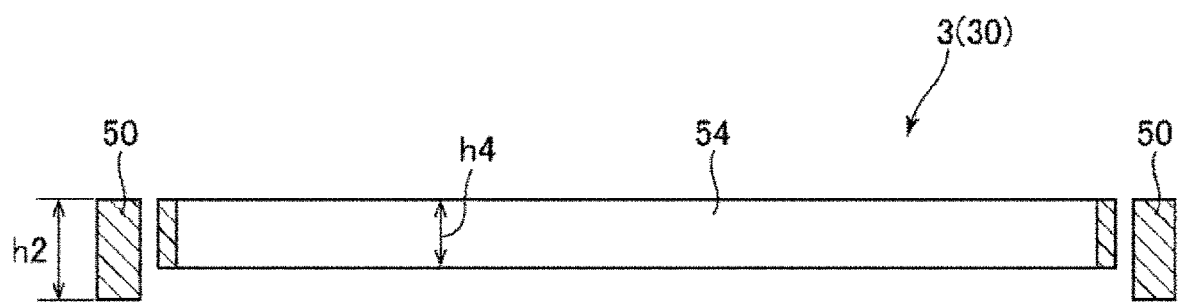
FIG. 9 is a cross-sectional view taken along the line IX-IX in FIG. 1.
Figure 10:
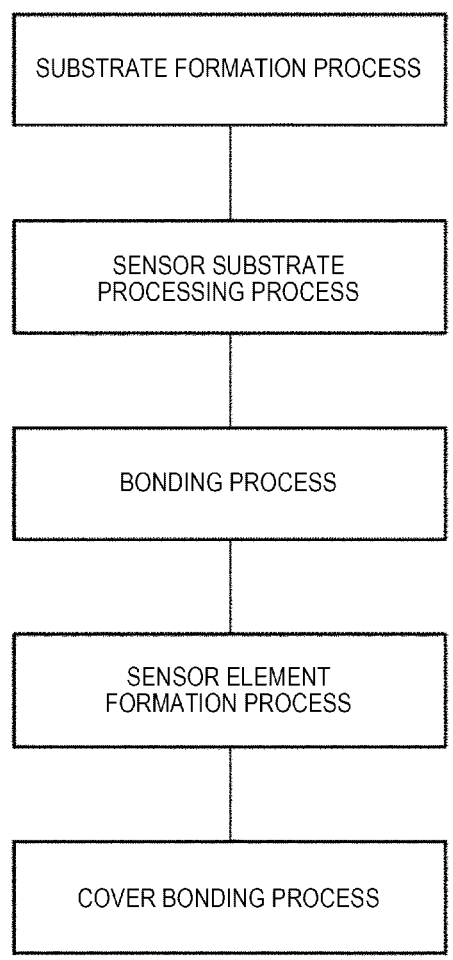
FIG. 10 is a view showing a manufacturing process of the physical quantity sensor shown in FIG. 1.
Figure 11:
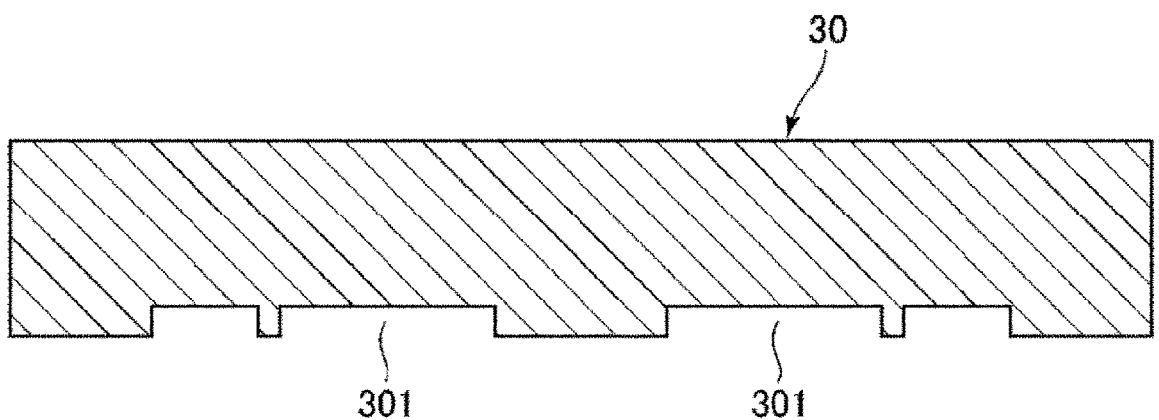
FIG. 11 is a cross-sectional view for describing a method of manufacturing the physical quantity sensor shown in FIG. 1.
Figure 14:
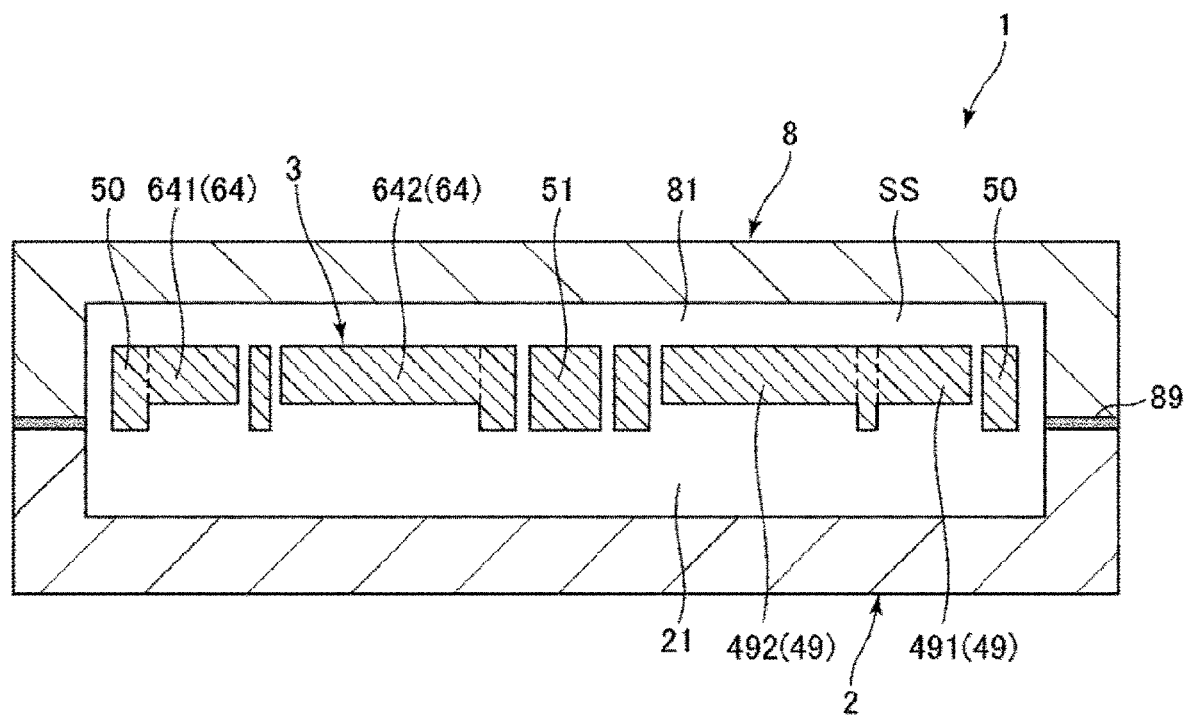
FIG. 14 is a cross-sectional view for describing a method of manufacturing the physical quantity sensor shown in FIG. 1.

FIG. 1 is a plan view showing a physical quantity sensor according to the first embodiment. FIG. 2 is a cross-sectional view taken along the line II-II in FIG. 1. FIG. 3 is a plan view showing a first movable electrode finger and a first fixed electrode finger. FIG. 4 is a plan view showing a second movable electrode finger and a second fixed electrode finger. FIG. 5 is a cross-sectional view taken along the line V-V in FIG. 1. FIG. 6 is a cross-sectional view taken along the line VI-VI in FIG. 1. FIG. 7 is a perspective view showing a model used for describing an effect of the present disclosure. FIG. 8 is a cross-sectional view taken along the line VIII-VIII in FIG. 1. FIG. 9 is a cross-sectional view taken along the line IX-IX in FIG. 1. FIG. 10 is a view showing a manufacturing process of the physical quantity sensor shown in FIG. 1. FIGS. 11 and 14 are cross-sectional views for describing a method of manufacturing the physical quantity sensor shown in FIG. 1.

In each drawing, an X axis, a Y axis, and a Z axis which are three axes orthogonal to each other are illustrated. In addition, the direction parallel along the X axis is also referred to as an "X axis direction", the direction parallel along the Y axis is also referred to as a "Y axis direction", and the direction parallel along the Z axis is also referred to as a "Z axis direction". In each axis, a leading end side of the arrow is referred to as "positive side", and the opposite side is also referred to as "negative side". Further, the positive side in the Z axis direction is also referred to as "upper side", and the negative side in the Z axis direction is also referred to as "lower side".

In the present specification, the term "orthogonal" includes not only a case where two elements intersect each other at 90° but also a case where two elements intersect each other at an angle which is slightly inclined from 90°, for example, within a range of 90°±10°. Specifically, a case where the X axis is inclined within a range of ±10° with respect to a normal direction to a YZ plane, a case where the Y axis is inclined within a range of ±10° with respect to a normal direction to an XZ plane, and a case where the Z axis is inclined within a range of ±10° with respect to a normal direction to an XY plane are also included in the term "orthogonal". Further, in the description of the present application, the term "parallel" includes a case where one is slightly inclined with respect to the other, for example, within ±10°, in addition to the case of being completely parallel.

The physical quantity sensor 1 shown in FIG. 1 is an acceleration sensor capable of measuring an acceleration Ax in the X axis direction. The physical quantity sensor 1 includes a substrate 2, a sensor element 3 disposed on the substrate 2, and a cover 8 bonded to the substrate 2 to cover the sensor element 3.

Substrate

As shown in FIG. 1, the substrate 2 includes a depressed portion 21 opened on the upper surface side. Further, in a plan view from the Z axis direction, the depressed portion 21 is formed larger than the sensor element 3, and includes the sensor element 3 therein. In addition, the substrate 2 includes three grooves 25, 26 and 27 opened to the upper surface side. The substrate 2 also includes three projection-like mounts 22, 23, and 24 provided on a bottom of the depressed portion 21. A first fixed electrode 41 described below is bonded to the mount 22, a second fixed electrode 46 described below is bonded to the mount 23, and a fixed portion 51 described below is bonded to the mount 24.

As the substrate 2, a glass material containing alkali metal ions, for example, a glass substrate containing borosilicate glass such as Tempax glass or Pyrex glass (all registered trademarks) may be used. This facilitates processing of the substrate 2. Furthermore, the substrate 2 and the sensor element 3 may be bonded by anodic bonding, and these may be strongly bonded. In addition, the substrate 2 having light transmittance may be obtained, such that the state of the sensor element 3 may be visually recognized from the outside of the physical quantity sensor 1. However, the substrate 2 is not limited to the glass substrate, and for example, a silicon substrate or a ceramic substrate may be used as the substrate 2.

Further, as shown in FIG. 1, wirings 71, 72, and 73 are provided in the grooves 25, 26, and 27. One ends of the wirings 71, 72, and 73 are exposed to the outside of the cover 8 and serve as terminals for electrically connecting to an external device, respectively. In addition, as shown in FIG. 2, the other end of the wiring 71 is electrically connected to the first fixed electrode 41 on the mount 22, the other end of the wiring 72 is electrically connected to the second fixed electrode 46 on the mount 23, and the wiring 73 is electrically connected to the fixed portion 51 on the mount 24.

Cover

As shown in FIG. 2, the cover 8 includes a depressed portion 81 opened to a lower surface side. In addition, the cover 8 is bonded to an upper surface of the substrate 2 to store the sensor element 3 in the depressed portion 81. A storage space SS for airtightly storing the sensor element 3 is formed by the cover 8 and the substrate 2. Such a cover 8 is formed of a silicon substrate and is bonded with glass frits 89. However, the material of the cover 8 and the method of bonding the cover 8 and the substrate 2 are not particularly limited.

Sensor Element

As shown in FIG. 1, the sensor element 3 includes a fixed electrode 4 fixed to the substrate 2, a fixed portion 51 fixed to the substrate 2, and a movable part 52 to be displaced in the X axis direction, that is, an axis for measuring the acceleration Ax with respect to the fixed portion 51, and springs 53 and 54 connecting the fixed portion 51 and the movable part 52. In addition, the movable part 52 includes a base part 50 as a mass portion and a movable electrode 6 supported by the base part 50. The sensor element 3 may be formed by patterning a sensor substrate 30 formed of a silicon substrate doped with impurities such as phosphorus (P) and boron (B) by dry etching. The sensor element 3 is bonded to the mounts 22, 23, and 24 by anodic bonding. However, the material of the sensor element 3 and the method of bonding the sensor element 3 and the substrate 2 are not particularly limited.

As shown in FIG. 1, the fixed portion 51 has a longitudinal shape extending in the X axis direction, and is bonded to the mount 24 at a negative side end in the X axis direction. Hereinafter, in a plan view from the Z axis direction, the fixed portion 51 is bisected and a virtual axis along the X axis is also referred to as a central axis C of the sensor element 3.

The base part 50 has a frame shape in a plan view from the Z axis direction, and surrounds the fixed portion 51, the springs 53 and 54, and the first and second fixed electrodes 41 and 46. Further, the base part 50 includes a first opening 528 located on the positive side in the Y axis direction with respect to the central axis C and having the first fixed electrode 41 disposed therein, and a second opening 529 located on the negative side in the Y axis direction with respect to the central axis C and having the second fixed electrode 46 therein.

The springs 53 and 54 are each elastically deformable in the X axis direction, and the elastic deformation of the springs 53 and 54 causes the base part 50 to be displaced with respect to the fixed portion 51 in the X axis direction. The spring 53 connects the fixed portion 51 and the base part 50 on the positive side in the X axis direction of the fixed portion 51, and the spring 54 connects the fixed portion 51 and the base part 50 on the negative side in the X axis direction of the fixed portion 51.

Further, the fixed electrode 4 includes a first fixed electrode 41 located in the first opening 528 and a second fixed electrode 46 located in the second opening 529.

The first fixed electrode 41 includes a first fixed portion 42 bonded to the mount 22, a first trunk portion 43 supported by the first fixed portion 42, and a plurality of first fixed electrode fingers 44 extending from the first trunk portion 43 to both sides in the Y axis direction.

The first trunk portion 43 has a bar-like shape, with one end being connected to the first fixed portion 42 and the other end being a free end. In addition, the first trunk portion 43 extends along an axis Q1 inclined with respect to each of the X axis and the Y axis in the plan view from the Z axis direction. The axis Q1 is inclined such that a separation distance between the axis Q1 and the central axis C increases toward the positive side in the X axis direction. As a result, the first fixed portion 42 may be easily disposed close to the fixed portion 51. The inclination of the axis Q1 with respect to the X axis is not particularly limited, but is preferably 10° or more and 45° or less, and more preferably 10° or more and 30° or less, for example. Thereby, the spread of the first fixed electrode 41 in the Y axis direction may be suppressed, and the sensor element 3 may be miniaturized.

The first fixed electrode finger 44 includes a first fixed electrode finger 441 extending from the first trunk portion 43 to a positive side in the Y axis direction, and a first fixed electrode finger 442 extending from the first trunk portion 43 to a negative side in the Y axis direction. As described above, by extending the first fixed electrode finger 44 from the first trunk portion 43 to both sides in the Y axis direction, the length of the first fixed electrode finger 44 may be shortened as compared with when the first fixed electrode finger 44 is extended from one side of the first trunk portion 43. Therefore, the first fixed electrode finger 44 is less likely to be broken.

In addition, a plurality of first fixed electrode fingers 441 and 442 are provided at intervals from each other along the X axis direction. Further, the first fixed electrode fingers 441 are shorter as being located on the positive side in the X axis direction, and the first fixed electrode fingers 442 are longer as being located on the positive side in the X axis direction.

The second fixed electrode 46 includes a second fixed portion 47 fixed to the mount 23, a second trunk portion 48 supported by the second fixed portion 47, and a plurality of second fixed electrode fingers 49 extending from the second trunk portion 48 to both sides in the Y axis direction.

The second trunk portion 48 has a bar-like shape, with one end being connected to the second fixed portion 47 and the other end being a free end. In addition, the second trunk portion 48 extends along an axis Q2 inclined with respect to each of the X axis and the Y axis in the plan view from the Z axis direction. The axis Q2 is inclined such that the separation distance between the axis Q2 and the central axis C increases toward the positive side in the X axis direction. As a result, the second fixed portion 47 may be easily disposed close to the fixed portion 51. The inclination of the axis Q2 with respect to the X axis is not particularly limited, but is preferably 10° or more and 45° or less, and more preferably 10° or more and 30° or less, for example. Thereby, the spread of the second fixed electrode 46 in the Y axis direction may be suppressed, and the sensor element 3 may be miniaturized.

Moreover, the axis Q2 is line symmetrical with the axis Q1 with respect to the central axis C. In other words, the first trunk portion 43 and the second trunk portion 48 are disposed in line symmetry with respect to the central axis C, that is, the X axis. As a result, the first fixed electrode 41 and the second fixed electrode 46 may be disposed in the sensor element 3 in a well-balanced manner. The configuration of the first trunk portion 43 and the second trunk portion 48 is not particularly limited, and each of the first trunk portion 43 and the second trunk portion 48 may extend along the X axis direction, or may be bent or curved in the middle, for example. In addition, the first and second trunk portions 43 and 48 may be asymmetric with respect to the central axis C.

As described above, by providing the first fixed portion 42 and the second fixed portion 47 in the vicinity of the fixed portion 51 by inclining the first trunk portion 43 and the second trunk portion 48, when the substrate 2 warps or bends due to heat, residual stress, and the like, a difference in shift between the movable part 52 and the fixed electrode 4 in the Z axis direction, specifically, a difference in shift between the first movable electrode finger 64 and the first fixed electrode finger 44 in the Z axis direction, and a difference in shift between the second movable electrode finger 69 and the second fixed electrode finger 49 in the Z axis direction may be effectively suppressed. Therefore, the physical quantity sensor 1 with high measurement accuracy is obtained.

The second fixed electrode finger 49 includes a second fixed electrode finger 491 extending from the second trunk portion 48 to the negative side in the Y axis direction and a second fixed electrode finger 492 extending from the second trunk portion 48 to the positive side in the Y axis direction. As described above, by extending the second fixed electrode finger 49 from the second trunk portion 48 to both sides in the Y axis direction, the length of the second fixed electrode finger 49 may be shortened as compared with when the second fixed electrode finger 49 is extended from one side of the second trunk portion 48. Therefore, the second fixed electrode finger 49 is less likely to be broken.

In addition, a plurality of second fixed electrode fingers 491 and 492 are provided at intervals from each other along the X axis direction. Further, the second fixed electrode fingers 491 are shorter as being located on the positive side in the X axis direction, and the second fixed electrode fingers 492 are longer as being located on the positive side in the X axis direction.

Further, as shown in FIG. 1, the movable electrode 6 includes a first movable electrode finger 64 located in the first opening 528 and supported by the movable part 52, and a second movable electrode finger 69 located in the second opening 529 and supported by the movable part 52.

The first movable electrode finger 64 includes a first movable electrode finger 641 located on the positive side in the Y axis direction with respect to the first trunk portion 43 and facing the first fixed electrode finger 441 along the X axis, and a first movable electrode finger 642 located on the negative side in the Y axis direction with respect to the first trunk portion 43 and facing the first fixed electrode finger 442 along the X axis. Further, a plurality of first movable electrode fingers 641 are provided at intervals from each other along the X axis direction, and engaged with the plurality of first fixed electrode fingers 441 in a comb shape. Likewise, a plurality of first movable electrode fingers 642 are provided at intervals from each other along the X axis direction, and engaged with the plurality of first fixed electrode fingers 442 in a comb shape.

Further, the first movable electrode fingers 641 are shorter as being located on the positive side in the X axis direction, and the first movable electrode fingers 642 are longer as being located on the positive side in the X axis direction. Each of the first movable electrode fingers 64 is located on the positive side in the X axis direction with respect to the first fixed electrode finger 44 paired therewith, and faces the first fixed electrode finger 44 through a gap. The first movable electrode finger 64 faces the first fixed electrode finger 44 paired therewith on the negative side in the X axis direction, and faces, on the positive side in the X axis direction, the first fixed electrode finger 44 not paired therewith, that is, faces the first fixed electrode finger 44 paired with another first movable electrode finger 64. Then, as shown in FIG. 3, the first movable electrode finger 64 is disposed such that the separation distance D1 from the first fixed electrode finger 44 paired therewith is smaller than the separation distance D2 from the first fixed electrode finger 44 not paired therewith. As a result, the electrostatic capacitance formed between it and the first fixed electrode finger 44 paired therewith may be further increased, and the electrostatic capacitance formed between it and the first fixed electrode finger 44 not paired therewith may be further decreased.

The second movable electrode finger 69 includes a second movable electrode finger 691 located on the negative side in the Y axis direction with respect to the second trunk portion 48 and facing the second fixed electrode finger 491, and a second movable electrode finger 692 located on the positive side in the Y axis direction with respect to the second trunk portion 48 and facing the second fixed electrode finger 492. In addition, a plurality of second movable electrode fingers 691 are provided at intervals from each other along the X axis direction, and engaged with the plurality of second fixed electrode fingers 491 in a comb shape. Likewise, a plurality of second movable electrode fingers 692 are provided at intervals from each other along the X axis direction, and engaged with the plurality of second fixed electrode fingers 492 in a comb shape.

Further, the second movable electrode fingers 691 are shorter as being located on the positive side in the X axis direction, and the second movable electrode fingers 692 are longer as being located on the positive side in the X axis direction. Each of the second movable electrode fingers 69 is located on the negative side in the X axis direction with respect to the second fixed electrode finger 49 paired therewith, and faces the second fixed electrode finger 49 through a gap.

The second movable electrode finger 69 faces the second fixed electrode finger 49 paired therewith on the positive side in the X axis direction, and faces, on the negative side in the X axis direction, the second fixed electrode finger 49 not paired therewith, that is, faces the second fixed electrode finger 49 paired with another second movable electrode finger 69. Then, as shown in FIG. 4, the second movable electrode finger 69 is disposed such that a separation distance D3 from the second fixed electrode finger 49 paired therewith is smaller than a separation distance D4 from the second fixed electrode finger 49 not paired therewith. As a result, the electrostatic capacitance formed between it and the second fixed electrode finger 49 paired therewith may be further increased, and the electrostatic capacitance formed between it and the second fixed electrode finger 49 not paired therewith may be further decreased.

The configuration of the physical quantity sensor 1 has been briefly described above. When an acceleration Ax is applied to such a physical quantity sensor 1, the movable part 52 is displaced in the X axis direction while elastically deforming the springs 53 and 54 based on the magnitude of the acceleration Ax. According to such displacement, a gap between the first movable electrode finger 64 and the first fixed electrode finger 44 and a gap between the second movable electrode finger 69 and the second fixed electrode finger 49 vary individually, and according to such displacement, the electrostatic capacitance between the first movable electrode finger 64 and the first fixed electrode finger 44 and the electrostatic capacitance between the second movable electrode finger 69 and the second fixed electrode finger 49 vary individually. Therefore, the acceleration Ax may be measured based on the variation in electrostatic capacitance.

In this example, as a method of increasing the measurement sensitivity for the acceleration Ax, there is a method of increasing the mass of the movable portion, that is, the movable part 52 when experiencing the acceleration Ax, and as a method of increasing the mass of the movable part 52, there is a method of thickening the thickness h (the length in the Z axis direction) of the sensor substrate 30 in which the sensor element 3 is formed. However, when the thickness h of the sensor substrate 30 is uniformly increased over the entire region, the first and second movable electrode fingers 64 and 69 and the first and second fixed electrode fingers 44 and 49 are also thickened, and thus the viscous resistance between the first movable electrode finger 64 and the first fixed electrode finger 44 and the viscous resistance between the second movable electrode finger 69 and the second fixed electrode finger 49 are increased, resulting in the deteriorated damping characteristic of the movable part 52. When the damping characteristic of the movable part 52 is deteriorated, a decrease in Q value and an increase in the Brown noise occur, which also causes a decrease in measurement sensitivity. Therefore, the enhancement of the measurement sensitivity for the acceleration Ax resulting from the increased mass of the movable part 52 is compromised by the deterioration of the damping characteristic of the movable part 52, and the measurement sensitivity for the acceleration Ax may not be effectively increased.

Therefore, in the physical quantity sensor 1 according to the present embodiment, as shown in FIGS. 5 and 6, in the movable part 52, only the thickness h2 of the base part 50 is increased, without increasing the thickness h1 of the first and second movable electrode fingers 64 and 69, that is, while keeping the thickness h1 constant. That is, the relationship h1<h2 is satisfied. By satisfying such a relationship, the mass of the movable part 52 may be increased while suppressing the deterioration of the damping characteristic of the movable part 52. Therefore, the measurement sensitivity for the acceleration Ax may be effectively increased, and the physical quantity sensor 1 having excellent measurement sensitivity may be obtained. In this example, the first and second movable electrode fingers and 69 refer to a portion that forms electrostatic capacitances with the corresponding first and second fixed electrode fingers 44 and 49, and the rest corresponds to the base part 50.

Hereinafter, the effects described above will be described in more detail. The following description will be made using the model shown in FIG. 7 for convenience of description. It is assumed that the thickness of the sensor substrate 30 is h, the width of the springs 53 and 54 is w, the spring length of the springs 53 and 54 is b, the length of a portion where the first and second movable electrode fingers 64 and 69 and the first and second fixed electrode fingers 44 and 49 face each other is 1, the gap between the first and second movable electrode fingers 64 and 69 and the first and second fixed electrode fingers 44 and 49 is d, and the area of the movable part 52 in the plan view from the Z axis direction is A. Furthermore, it is assumed that the Young's modulus of the constituent material of the sensor substrate 30 is E, and the specific gravity is a. In addition, it is assumed that the dielectric constant between the first and second movable electrode fingers 64 and 69 and the first and second fixed electrode fingers 44 and 49 is $\varepsilon$, and the viscosity coefficient of the gas present between the first and second movable electrode fingers 64 and 69 and the first and second fixed electrode fingers 44 and 49 is $\mu$. Further, it is assumed that the number of pairs of movable electrode fingers and fixed electrode fingers is n.

First, the case where the thickness h of the sensor substrate 30 is simply increased will be described. The damping constant D (viscosity constant) generated between the movable electrode finger and the fixed electrode finger is expressed by the following Equation (1). The damping constant D is proportional to the cube of the thickness h of the sensor substrate 30, but is inversely proportional to the cube of the inter-electrode gap d, which is the gap between the movable electrode finger and the fixed electrode finger. From Equation (1), it may be seen that when the thickness his simply increased, the damping constant D is increased in proportion to the cube of the thickness h ($h^3$), which directly leads to the deterioration of the noise characteristic and the frequency response characteristic.

$$D = n\mu l \left(\frac{h}{d}\right)^3 \propto h^3 \quad (1)$$

The Q value is expressed by the following Equation (2). In addition, it may be seen that the spring constant k and the mass M included in the Equation (2) are expressed by the Equations (3) and (4), and both increase in proportion to the thickness h of the sensor substrate 30. Furthermore, when Equation (3) and Equation (4) are substituted in Equation (2), it is the right side of Equation (2). From Equation (2), it may be seen that the Q value is inversely proportional to the square of the thickness h ($h^2$). That is, it may be said that, as the thickness h increases, the Q value decreases and attenuates significantly, resulting in the reduced bandwidth.

$$Q = \frac{\sqrt{Mk}}{D} = \frac{d^3}{n\mu l h^2}\sqrt{Aa E\left(\frac{w}{b}\right)^3} \propto \frac{1}{h^2} \quad (2)$$

$$k = Eh\left(\frac{w}{b}\right)^3 \quad (3)$$

$$M = Aha \quad (4)$$

At this time, the Brown noise BNEA at the sensor element 3 is expressed by the following Equation (5).

The damping constant D is proportional to the cube of the thickness h of the sensor substrate 30, and the mass M is proportional to the thickness h of the structure. Therefore, it may be seen that the Brown noise BNEA is increased in proportion to the square root ($\sqrt{h}$) of the thickness h.

$$BNEA = \frac{\sqrt{4 k_B T D}}{M} \propto \sqrt{h} \quad (5)$$

Further, the resonant angular frequency$\omega 0$ of the movable portion (the assembly of the movable part 52 and the springs 53 and 54) with respect to the substrate 2 is expressed by the following Equation (6). Since the spring constant k and the mass M are proportional to the thickness h of the sensor substrate 30, it may be seen that the resonant angular frequency coo does not depend on the thickness h.

$$\omega_0 = \sqrt{\frac{k}{M}} \quad (6)$$

Moreover, the sensitivity S of measurement is expressed by the following Equation (7). It may be seen that since the mass M and the spring constant k are proportional to the thickness h of the sensor substrate 30, the sensitivity S is proportional to the thickness h.

$$S = \frac{2n\varepsilon h l}{d^2}\frac{M}{k} = \frac{2n\varepsilon h l}{d^2 \omega_0^2} \propto h \quad (7)$$

The case where the thickness h of the sensor substrate 30 is increased has been described above. In summary, when only the thickness h of the sensor substrate 30 is simply increased, the damping constant D is increased in proportion to the cube of the thickness h ($h^3$), and the Q value is decreased in an inverse proportion to the square of thickness h ($h^2$). In addition, the Brown noise BNEA is increased in proportion to the square root ($\sqrt{h}$) of the thickness h. Further, since the spring constant k and the mass M are proportional to the thickness h, the resonant angular frequency $\omega 0$ is a constant value regardless of the increase in the thickness h. Although the sensitivity S eventually is increased in proportion to the thickness h, the ratio S/N of the sensitivity S to the Brown noise BNEA is $\sqrt{h}$.

Thus, since simply increasing the thickness h of the sensor substrate 30 causes a decrease in the Q value and an increase in the Brown noise BNEA, it is desirable that the thickness h is increased while keeping the damping constant D and the Q value constant. When the thickness h is changed while keeping the damping constant D and the Q value constant, how the respective characteristics depend on the thickness h will be described in order.

In order to keep the damping constant D constant, in a case in which the thickness h of the sensor substrate 30 is increased in Equation (1), the inter-electrode gap d is also increased at the same rate. This is because the inter-electrode gap d is proportional to the thickness h, that is, the relation of d∝h holds. It is desirable that the sensor element 3 does not have excessive resonance and attenuation characteristics, and accordingly, it is generally designed such that the Q value is always about 1. Here, as described above, when the damping constant D is designed to be constant, it is necessary to make M*k as the product of the mass M and the spring constant k always be constant in the Equation (2). Since the mass M is proportional to the thickness h of the sensor substrate 30, it is necessary to design the spring constant k to be inversely proportional to the thickness h in order to make the product M*k of the mass M and the spring constant k constant. Therefore, the Q value may be made constant by designing the spring width w and the spring length b to satisfy the following Equation (8).

$$k = Eh\left(\frac{w}{b}\right)^3 \propto \frac{1}{h} \quad (8)$$

$$\therefore \left(\frac{w}{b}\right)^3 \propto \frac{1}{h^2}$$

From the fact that the damping constant D does not depend on the thickness h of the sensor substrate 30, and the mass M is proportional to the thickness h of the sensor substrate 30, it may be seen that the Brown noise BNEA is inversely proportional to the thickness h of the sensor substrate 30 as shown in the following Equation (9). Here, T in the Equation (9) is an absolute temperature, and $k_B$ is a Boltzmann constant.

$$BNEA = \frac{\sqrt{4k_BTD}}{M} \propto \frac{1}{h} \quad (9)$$

In addition, when the conditions of the Equations (4) and (8) described above are satisfied, the resonant angular frequency ω0 is inversely proportional to the thickness h of the sensor substrate 30, as shown by the following Equation (10). That is, it may be seen that as the thickness h increases, the resonant angular frequency ω0 is decreased.

$$\omega_0 = \sqrt{\frac{k}{M}} \propto \frac{1}{h} \quad (10)$$

Further, the sensitivity S is expressed by the following Equation (11). From the fact that the inter-electrode gap d and the mass M are proportional to the thickness h of the sensor substrate 30, and the spring constant k is inversely proportional to the thickness h of the sensor substrate 30, it may be seen that the sensitivity S is proportional to the thickness h.

$$S = \frac{2n\varepsilon hl}{d^2} \frac{M}{k} = \frac{2n\varepsilon hl}{d^2 \omega_0^2} \propto h \quad (11)$$

The case where the thickness h is increased while keeping the damping constant D and the Q value constant has been described above. In summary, the damping constant D is kept to a constant value by increasing the inter-electrode gap d in proportion to the increase of the thickness h of the sensor substrate 30. In addition, although the mass M is proportional to the thickness h, the Q value is made constant by designing the spring constant k to be inversely proportional to the thickness h. At this time, the resonant angular frequency ω0 is inversely proportional to the thickness h, and the Brown noise BNEA is inversely proportional to the thickness h. Finally, the sensitivity S is increased in proportion to the thickness h, and a ratio S/N of the sensitivity S to the Brown noise BNEA is proportional to the square of the thickness h ($h^2$).

As described above, it may be said that in the case of increasing the thickness h while keeping the damping constant D and the Q value constant, the S/N is greater than in the case of simply increasing the thickness h. As described above, in the case in which the thickness h of the sensor substrate 30 is configured to be uniform, when attempting to increase sensitivity by increasing the thickness h, due to various trade-off relationships, a significant increase in the ratio S/N of the sensitivity S and the Brown noise BNEA cannot be expected. That is, (a) in the case in which only the thickness h of the sensor substrate 30 is simply increased, the increase of the damping constant D causes deterioration of the Brown noise BNEA and the frequency characteristics, and (b) in the case in which the thickness h of the sensor substrate 30 is increased while keeping the damping constant D and the Q value constant, likewise, only an increase in the sensitivity S proportional to the thickness h of the sensor substrate 30 can be expected. Furthermore, since the Brown noise BNEA also is increased in proportion to the thickness h of the sensor substrate 30, the ratio S/N of the sensitivity S to the Brown noise BNEA remains at 1.

Therefore, as described above, in the physical quantity sensor 1, in the movable part 52, only the thickness h2 of the base part 50 is increased while keeping the thickness h1 of the first and second movable electrode fingers 64 and 69 constant.

In this case, the damping constant D generated between the movable electrode finger and the fixed electrode finger is proportional to the cube of the thickness h1 ($h1^3$) and inversely proportional to the cube of the inter-electrode gap d ($d^3$) as expressed in Equation (1) above. Therefore, since the thickness h1 and the inter-electrode gap d are constant, the damping constant D is also constant.

Further, when Q value is designed to be constant with an increase in the thickness h2 of the base part 50, the proportional relationship between each parameter of the mass M, the spring constant k, the Brown noise BNEA, and the resonant angular frequency ω0 and the thickness h2 of the base part 50 is the same as in the two related-art structures described above. The sensitivity S is expressed by the following Equation (12). Since the inter-electrode gap d is constant, the mass M is proportional to the thickness h2 of the base part 50, and the spring constant k is inversely proportional to the thickness h2 of the base part 50, the sensitivity S is proportional to the square of the thickness h2 of the base part 50 (h2²). Thus, the sensitivity S is proportional to the square of the thickness h2, because the thickness h2 of the base part 50 may be increased without increasing the damping constant D because the inter-electrode gap d does not depend on the thickness h2 of the base part 50.

$$S = \frac{2n\varepsilon h1l}{d^2}\frac{M}{k} = \frac{2n\varepsilon h1l}{d^2\omega_0^2} \propto h2^2 \qquad (12)$$

In summary, according to the present embodiment, the damping constant D is constant when the inter-electrode gap d is constant. In addition, although the mass M is proportional to the thickness h2 of the base part 50, the Q value is made constant by designing the spring constant k to be inversely proportional to the thickness h2. At this time, the resonant angular frequency ω0 is inversely proportional to the thickness h2, and the Brown noise BNEA is inversely proportional to the thickness h2. Therefore, ultimately, the sensitivity S is proportional to the square of the thickness h2 (h2²), and the ratio S/N of the sensitivity S to the Brown noise BNEA is increased in proportion to the cube of the thickness h2 (h2³). Therefore, by increasing the thickness h2 of the base part 50 while keeping the thickness h1 of the first and second movable electrode fingers 64 and 69 constant, the sensitivity S may be greatly enhanced as compared with the two related-art structures described above. As a result, the physical quantity sensor 1 with excellent measurement sensitivity is obtained.

Note that it suffices to satisfy the relationship h1<h2 with respect to the thicknesses h1 and h2. That is, it suffices to satisfy the relationship h2/h1>1, for example, it is preferable to satisfy the relationship h2/h1>1.5, more preferably to satisfy the relationship h2/h2>2, and still more preferably to satisfy the relationship h2/h1>3. As a result, the thickness h2 of the base part 50 may be made sufficiently greater than the thickness h1 of the first and second movable electrode fingers 64 and 69, and the mass of the base part 50 may be effectively increased. Therefore, the effect described above may be exhibited more significantly. The values of h2/h1 may be the same or different from each other with respect to each of the first and second movable electrode fingers 64 and 69. Furthermore, each of the first and second movable electrode fingers 64 and 69 may have portions of different h2/h1.

Further, it suffices to satisfy the relationship h1<h2 with respect to at least one of the first and second movable electrode fingers 64 and 69, for example, it is preferable to satisfy with respect to 50% or more of the first and second movable electrode fingers 64 and 69, it is more preferable to satisfy with respect to 75% or more of the first and second movable electrode fingers 64 and 69, and it is still more preferable to satisfy with respect to 95% or more of the first and second movable electrode fingers 64 and 69. As a result, the effect described above may be exhibited more significantly. Moreover, it is preferable to satisfy the relationship of h1<h2 in the entire region in the longitudinal direction with respect to the first and second movable electrode fingers 64 and 69, but only a part of the first and second movable electrode fingers 64 and 69 may satisfy the relationship of h1<h2.

Further, it suffices to satisfy the relationship h1<h2 with respect to at least in some regions of the base part 50, for example, it is preferable to satisfy with respect to 50% or more of the region of the base part 50, it is more preferable to satisfy with respect to 75% or more of the region thereof, and it is still more preferable to satisfy with respect to 95% or more of the region thereof. As a result, the mass of the base part 50 may be more effectively increased, and the effects described above may be exhibited more significantly.

Further, as shown in FIGS. 5 and 6, the thickness h2 of the base part 50 is greater than the thickness h3 of the first and second fixed electrode fingers 44 and 49. That is, the length of the base part 50 along the Z axis direction is longer than that of the first and second fixed electrode fingers 44 and 49, and the relationship h3<h2 is satisfied. As a result, the facing area of the base part 50 and the first and second fixed electrode fingers 44 and 49 may be reduced, and the deterioration of the damping characteristic due to the gas present therebetween may be suppressed. Therefore, the physical quantity sensor 1 with more excellent measurement sensitivity is obtained.

Note that it is preferable to satisfy the relationship h2/h3>1.5 with respect to the thicknesses h2 and h3, for example, it is more preferable to satisfy the relationship h2/h3>2, and it is still more preferable to satisfy the relationship h2/h3>3. As a result, the thickness h2 of the base part 50 may be made sufficiently greater than the thickness h3 of the first and second fixed electrode fingers 44 and 49, and the mass of the base part 50 may be effectively increased. Therefore, the effect described above may be exhibited more significantly.

Further, it suffices to satisfy the relationship h3<h2 with respect to at least one of the first and second fixed electrode fingers 44 and 49, for example, it is preferable to satisfy with respect to 50% or more of the first and second fixed electrode fingers 44 and 49, it is more preferable to satisfy with respect to 75% or more of the first and second fixed electrode fingers 44 and 49, and it is still more preferable to satisfy with respect to 95% or more of the first and second fixed electrode fingers 44 and 49. As a result, the effect described above may be exhibited more significantly. Moreover, it is preferable that the first and second fixed electrode fingers 44 and 49 satisfy the relationship of h3<h2 in the entire region in the longitudinal direction, but only a part of the first and second movable electrode fingers 44 and 49 may satisfy the relationship of h3<h2.

In particular, in the present embodiment, the thickness h3 of the first and second fixed electrode fingers 44 and 49 is equal to the thickness h1 of the first and second movable electrode fingers 64 and 69. That is, the relationship h1≈h3, especially h1=h3, is satisfied. In addition, the first and second movable electrode fingers 64 and 69 and the first and second fixed electrode fingers 44 and 49 are located at the same height in the Z axis direction, and are aligned in the X axis direction without shifting in the Z axis direction. Therefore, the facing area of the first and second movable electrode fingers 64 and 69 and the first and second fixed electrode fingers 44 and 49 may be maximized. In addition, it may effectively suppress the deterioration of the damping characteristics due to the portion of the second fixed electrode fingers 44 and 49 protruding with respect to the first and second movable electrode fingers 64 and 69 in the Z axis direction and facing the base part 50. Therefore, the physical quantity sensor 1 with more excellent measurement sensitivity is obtained. In addition, the fact that h1 and h3 are equal to each other is meant to include an error that may occur on the order of ±5% or less in addition to the case where h1 and h3 coincide with each other. However, the thickness h3 is not particularly limited, and may be h3<h1 or h3>h1. When h3>h1, it may be h3=h2, for example.

Further, as shown in FIGS. 8 and 9, in the present embodiment, the thickness h4 of the springs 53 and 54 is smaller than the thickness h2 of the base part 50. That is, the relationship h4<h2 is satisfied. Thus, by making thickness h4 of springs 53 and 54 different from thickness h2 of base part 50, thickness h4 of springs 53 and 54 may be designed regardless of thickness h2 of base part 50. Therefore, adjustment of the spring constant of the springs 53 and 54 is easier.

Further, for example, it is preferable to satisfy the relationship 1>h4/h2≥0.3, it is more preferable to satisfy the relationship 1>h4/h2≥0.4, and it is still more preferable to satisfy the relationship 1>h4/h2≥0.5. By satisfying such a relationship, the thickness h4 of the springs 53 and 54 being excessively decreased, and the mechanical strength of the springs 53 and 54 being excessively reduced may be suppressed. Therefore, the physical quantity sensor 1 with sufficient mechanical strength may be obtained. The thickness h4 is not particularly limited, and may be h4=h2 or h4>h2.

Further, in the present embodiment, the upper surfaces of the individual parts of the sensor element 3 are flush with one another, and the lower surfaces of the first and second movable electrode fingers 64 and 69, the first and second fixed electrode fingers 44 and 49, and the springs 53 and 54 are individually shifted upward with respect to the lower surface of the other part. Such a configuration facilitates the manufacture of the sensor element 3 as described in the method of manufacturing described below.

The physical quantity sensor 1 has been described above. Such a physical quantity sensor 1 includes the substrate 2 in which the direction along the Z axis is the thickness direction when the three axes orthogonal to one another are the X axis, Y axis and Z axis as described above, and the sensor element 3 provided on the substrate 2 to measure the acceleration Ax which is the physical quantity. Further, the sensor element 3 includes the movable part 52 to be displaced in the direction along the X axis that is the axis for measuring the acceleration Ax with respect to the substrate 2, and the fixed electrode 4 fixed to the substrate 2, and the movable part 52 includes the movable electrode 6 disposed to face the fixed electrode 4 in the direction along the X axis and the base part 50 supporting the movable electrode 6 and serving as a mass portion having a longer length than the movable electrode 6 in the direction along the Z axis. More specifically, in the physical quantity sensor 1, the thickness h2 of the base part 50 is greater than the thickness h1 of the first and second movable electrode fingers 64 and 69 included in the movable electrode 6. When the thicknesses h1 and h2 satisfy such a relationship, the mass of the movable part 52 may be increased while the deterioration of the damping characteristic of the movable part 52 is suppressed. Therefore, the measurement sensitivity for the acceleration Ax may be effectively increased, and the physical quantity sensor 1 with more excellent measurement sensitivity is obtained.

Further, as described above, the base part 50 has a longer length than the fixed electrode 4 along the Z axis direction. Specifically, the thickness h2 of the base part 50 is greater than the thickness h3 of the first and second fixed electrode fingers 44 and 49 of the fixed electrode 4. Thus, by making thickness h4 of springs 53 and 54 different from thickness h2 of base part 50, thickness h4 of springs 53 and 54 may be designed regardless of thickness h2 of base part 50. Therefore, adjustment of the spring constant of the springs 53 and 54 is easier.

Further, as described above, the movable electrode 6 and the fixed electrode 4 have the same length along the Z axis direction. Specifically, the thickness h1 of the first and second movable electrode fingers 64 and 69 included in the movable electrode 6 and the thickness h3 of the first and second fixed electrode fingers 44 and 49 included in the fixed electrode 4 are equal to each other. Therefore, the facing area between the first and second movable electrode fingers 64 and 69 and the first and second fixed electrode fingers 44 and 49 may be maximized, while the deterioration of the damping characteristics due to the portion of the second fixed electrode fingers 44 and 49 protruding with respect to the first and second movable electrode fingers 64 and 69 in the Z axis direction and facing the base part 50 may be effectively suppressed. Therefore, the physical quantity sensor 1 with more excellent measurement sensitivity is obtained.

In addition, as described above, the sensor element 3 includes the fixed portion 51 fixed to the substrate 2 and the springs 53 and 54 that connect the fixed portion 51 and the movable part 52. As a result, with a simple configuration, the movable part 52 may be displaced with respect to the substrate 2 in the X axis direction. Further, as described above, the springs 53 and 54 have a shorter length in the Z axis direction than the base part 50. That is, the thickness h4 of the springs 53 and 54 is smaller than the thickness h2 of the base part 50. Thus, by making thickness h4 of springs 53 and 54 different from thickness h2 of base part 50, thickness h4 of springs 53 and 54 may be designed regardless of thickness h2 of base part 50. Therefore, adjustment of the spring constant of the springs 53 and 54 is easier.

Further, as described above, the fixed electrode 4 includes the first fixed electrode 41 and the second fixed electrode 46 which are disposed side by side in the direction along the Y axis. In addition, the first fixed electrode 41 includes a first trunk portion 43 and a plurality of first fixed electrode fingers 44 extending from the first trunk portion 43 on both sides in a direction along the Y axis, and the second fixed electrode 46 includes a second trunk portion 48 and a plurality of second fixed electrode fingers 49 extending from the second trunk portion 48 on both sides in the direction along the Y axis. With such a configuration, it may increase the electrostatic capacitance formed between the movable electrode 6 and the fixed electrode 4 while suppressing the lengths of the first and second fixed electrode fingers 44 and 49. Therefore, the physical quantity sensor 1 with the excellent mechanical strength and the excellent sensitivity is obtained. In addition, as described above, the first trunk portion 43 and the second trunk portion 48 extend along the directions inclined with respect to the X axis and the Y axis, respectively. Thereby, the first fixed portion 42 and the second fixed portion 47 may be provided in the vicinity of the fixed portion 51. Therefore, when the substrate 2 warps or bends due to heat, residual stress, and the like, a difference in shift between the movable part 52 and the fixed electrode 4 in the Z axis direction, specifically, a difference in shift between the first movable electrode finger 64 and the first fixed electrode finger 44 in the Z axis direction, and a difference in shift between the second movable electrode finger 69 and the second fixed electrode finger 49 in the Z axis direction may be effectively suppressed. As a result, the physical quantity sensor 1 with high measurement accuracy is obtained.

In addition, as described above, the first trunk portion 43 and the second trunk portion 48 are line symmetrical with respect to the central axis C, that is, the X axis. As a result, the first fixed electrode 41 and the second fixed electrode 46 may be disposed in a well-balanced manner.

In addition, as described above, the first fixed electrode fingers 442 extending from the first trunk portion 43 to the second trunk portion 48 side (central axis C side) and the second fixed electrode fingers 492 extending from the second trunk portion 48 to the first trunk portion 43 side (central axis C side) are disposed along the X axis, and the length in the Y axis direction gradually increases toward the positive side in the X axis direction (one side in the direction along the X axis). On the contrary, the first fixed electrode fingers 441 extending from the first trunk portion 43 to the opposite side of the second trunk portion 48 (opposite to the central axis C) and the second fixed electrode fingers 492 extending from the second trunk portion 48 to the opposite side of the first trunk portion 43 (opposite to the central axis C) are disposed along the X axis, and the length in the Y axis direction gradually increases toward the negative side in the X axis direction (the other side in the direction along the X axis). As a result, among the plurality of first fixed electrode fingers 44, the shorter first fixed electrode fingers 44 may be included and the first fixed electrode fingers 44 as a whole are less likely to be broken. Likewise, among the plurality of second fixed electrode fingers 49, the shorter second fixed electrode finger 49 may be included and the second fixed electrode finger 49 as a whole is less likely to be broken. The same applies to the first movable electrode finger 64 and the second movable electrode finger 69. Therefore, damage to the electrode fingers 44, 49, 64, and 69 is more effectively suppressed, and the physical quantity sensor 1 that can exhibit excellent impact resistance may be obtained.

In addition, as described above, the first movable electrode finger 64 is located between the pair of first fixed electrode fingers 44 adjacent in the X axis direction, and the separation distance D1 between the first fixed electrode finger 44 and the first movable electrode finger 64 paired with each other, and the separation distance D2 between the first fixed electrode finger 44 and the first movable electrode finger 64 not paired with each other are different from each other. Likewise, the second movable electrode finger 69 is located between the pair of second fixed electrode fingers 49 adjacent in the X axis direction, and the separation distance D3 between the second fixed electrode finger 49 and the second movable electrode finger 69 paired with each other, and the separation distance D4 between the second fixed electrode finger 49 and the second movable electrode finger 69 not paired with each other are different from each other. As a result, the electrostatic capacitance formed between the second fixed electrode finger 49 paired therewith may be further increased, and the electrostatic capacitance formed between the second fixed electrode finger 49 not paired therewith may be further decreased.

Next, a method of manufacturing the physical quantity sensor 1 will be described. As shown in FIG. 10, the method of manufacturing the physical quantity sensor 1 includes a substrate formation process of forming the substrate 2, a sensor substrate processing process of forming a depressed portion in the sensor substrate 30, a bonding process of bonding the sensor substrate 30 to the substrate 2, a sensor element formation process of etching the sensor substrate 30 to form the sensor element 3, and a cover bonding process of bonding the cover 8 to the substrate 2.

Substrate Formation Process

First, the substrate 2 made of a glass substrate is prepared, and the depressed portion 21 and the grooves 25, 26, and 27 opened on the upper surface side and the mounts 22, 23, and 24 are formed using the photolithographic technique and the etching technique. Next, the wirings 71, 72, and 73 are formed in the grooves 25, 26, and 27, respectively. As the etching technique, for example, wet etching, dry etching, and the like may be used.

Sensor Substrate Formation Process

Next, as shown in FIG. 11, a sensor substrate 30 which is a base material of the sensor element 3 and is made of a silicon substrate is prepared, and a depressed portion 301 opened on the lower surface side of the substrate 2 is formed using the photolithography technique and the etching technique. Here, the depressed portion 301 is formed to include a portion in which the first and second movable electrode fingers 64 and 69 and the first and second fixed electrode fingers 44 and 49 are formed, and a portion in which the springs 53 and 54 are formed. As the etching technique, for example, wet etching, dry etching, and the like may be used.

Bonding Process

Figure 12:
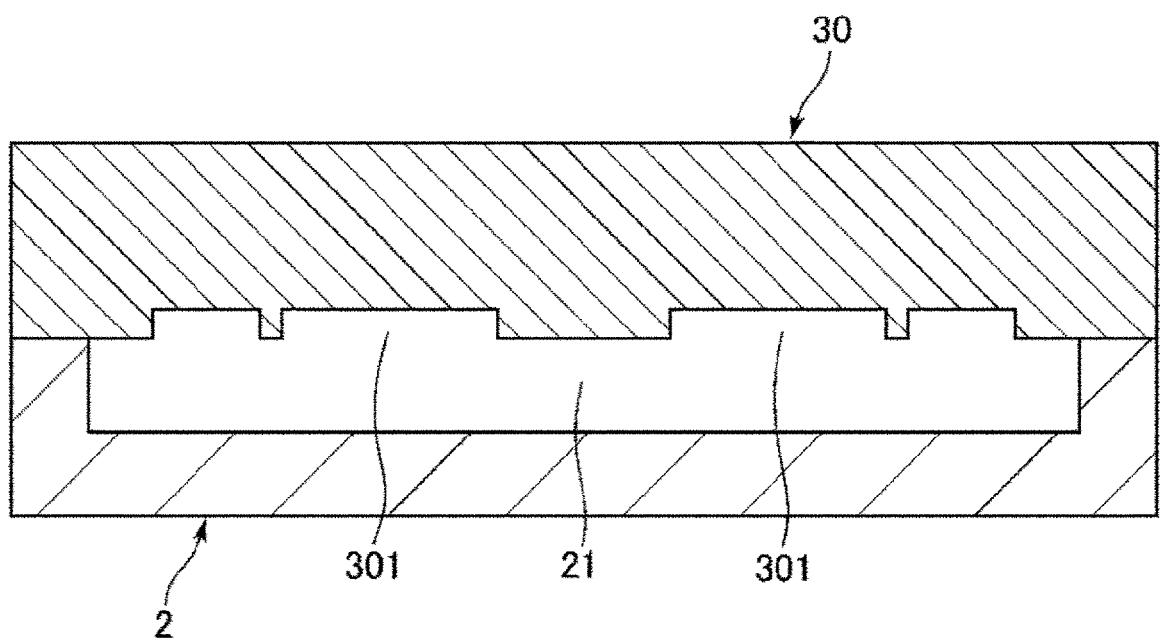
FIG. 12 is a cross-sectional view for describing a method of manufacturing the physical quantity sensor shown in FIG. 1.

Next, as shown in FIG. 12, the sensor substrate 30 is bonded to the upper surface of the substrate 2 in a posture in which the surface with the depressed portion 301 formed is directed toward the substrate 2 side. In addition, the method of bonding is not specifically limited, and may be performed using anodic bonding, for example.

Sensor Element Formation Process

Figure 13:
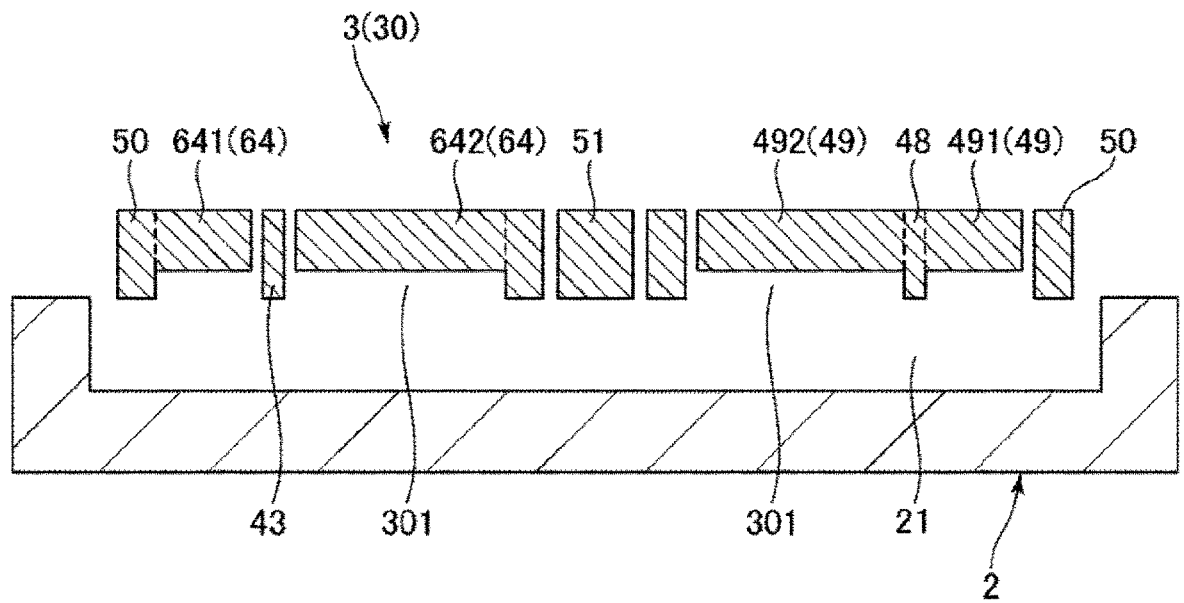
FIG. 13 is a cross-sectional view for describing a method of manufacturing the physical quantity sensor shown in FIG. 1.

Next, depending on needs, the sensor substrate 30 is thinned from the upper surface side by chemical mechanical polishing (CMP) and the like to make the sensor substrate 30 with a predetermined thickness. Next, as shown in FIG. 13, the sensor element 3 is formed by patterning the sensor substrate 30 using the photolithography technique and the etching technique. At this time, the first and second movable electrode fingers 64 and 69, the first and second fixed electrode fingers 44 and 49, and the springs 53 and 54 are formed from the portion overlapping the depressed portion 301. As the etching technique, for example, wet etching, dry etching, and the like may be used.

Cover Bonding Process

Next, as shown in FIG. 14, the cover 8 is prepared, and the cover 8 is bonded to the upper surface of the substrate 2 using the glass frits 89. Thereby, the storage space SS is formed, and the sensor element 3 is stored in the storage space SS.

The physical quantity sensor 1 is obtained by the above processes. According to such a method of manufacturing, the depressed portion 301 is formed on the lower surface of the sensor substrate 30, so that the physical quantity sensor 1 may be manufactured more easily. Specifically, by forming the depressed portion 301 on the lower surface of the substrate 2, the upper surface of the substrate 2 may be kept flat. Therefore, in the sensor element formation process, it is easy to form an etching resistant mask on the upper surface of the substrate 2 by the photolithography technique, and the accuracy thereof also is high. Therefore, the physical quantity sensor 1 is more easily manufactured.

Second Embodiment

Figure 15:
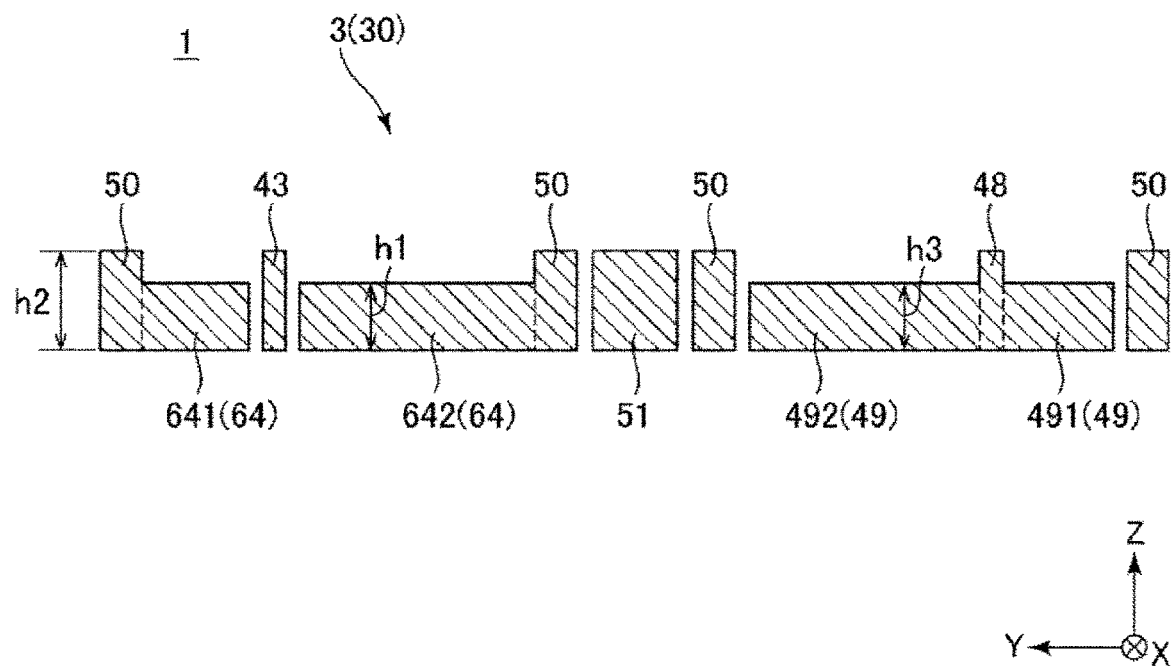
FIG. 15 is a cross-sectional view showing a physical quantity sensor according to a second embodiment of the present disclosure.
Figure 16:
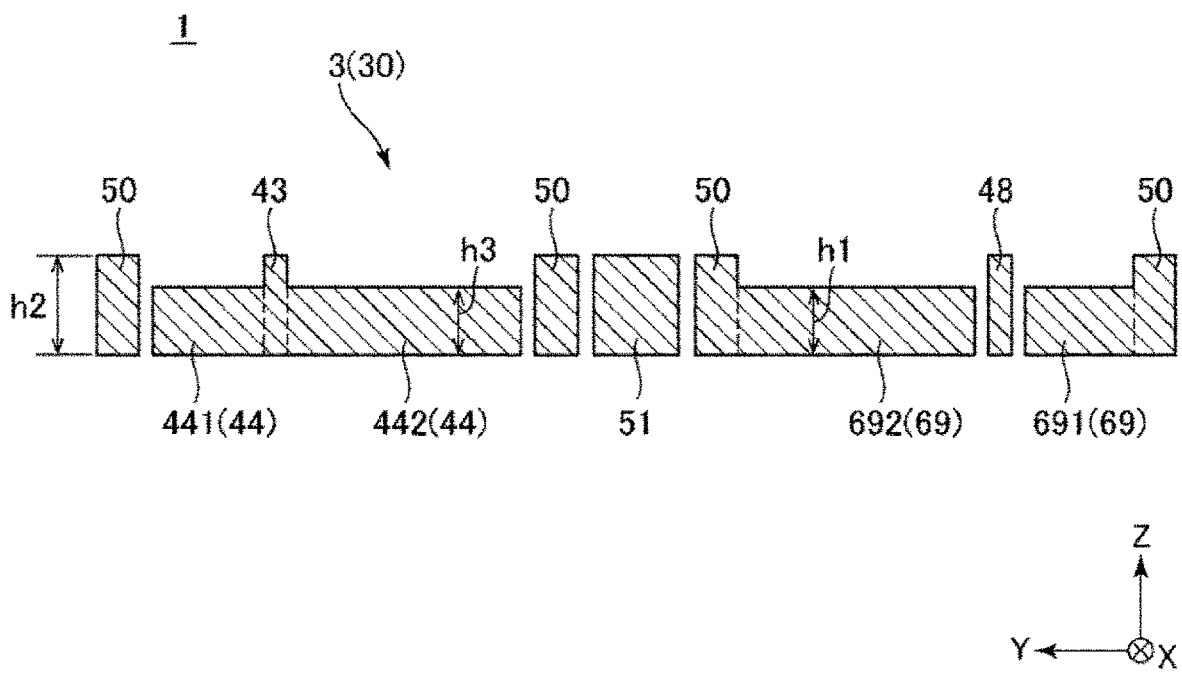
FIG. 16 is a cross-sectional view showing a physical quantity sensor according to the second embodiment of the present disclosure.
Figure 17:
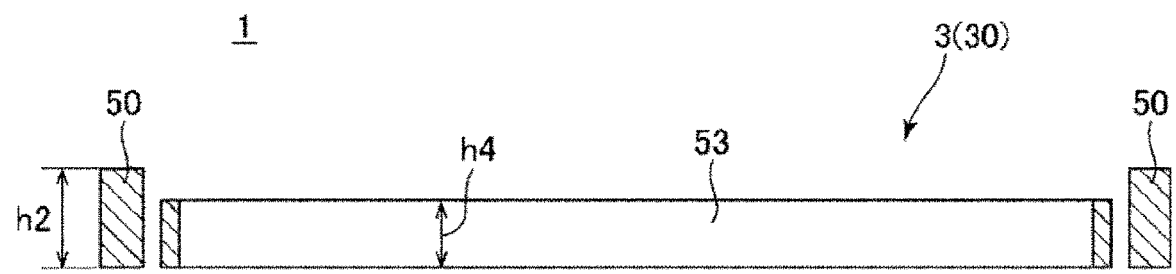
FIG. 17 is a cross-sectional view showing a physical quantity sensor according to the second embodiment of the present disclosure.
Figure 18:
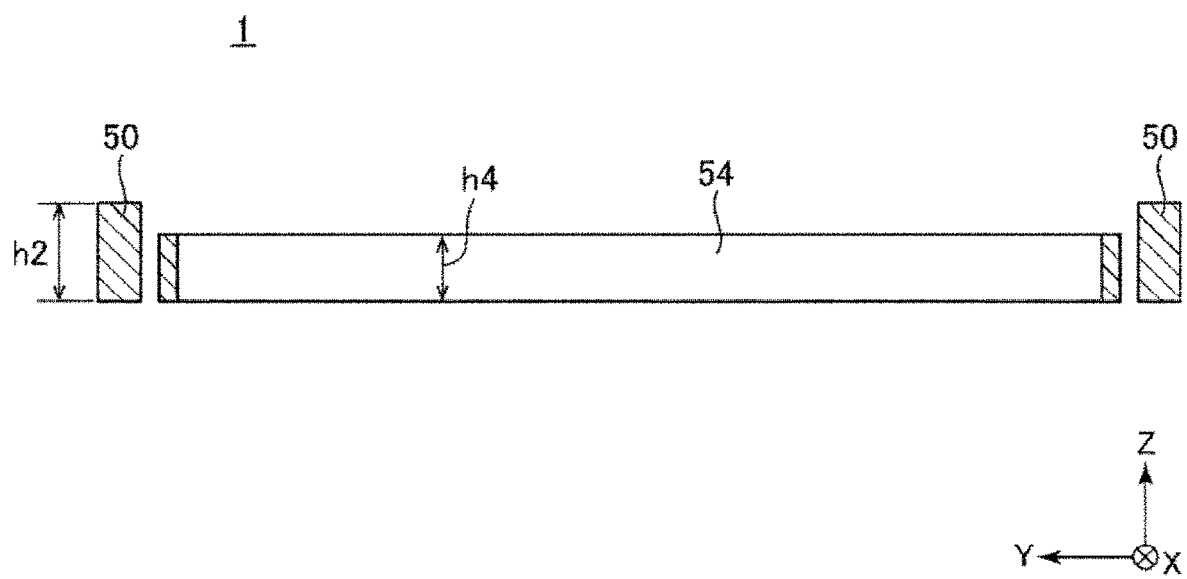
FIG. 18 is a cross-sectional view showing a physical quantity sensor according to the second embodiment of the present disclosure.

FIGS. 15 to 18 are cross-sectional views showing the physical quantity sensor according to the second embodiment. FIG. 15 corresponds to a cross-sectional view taken along the line XV-XV in FIG. 1, FIG. 16 corresponds to a cross-sectional view taken along the line XVI-XVI in FIG. 1, FIG. 17 corresponds to a cross-sectional view taken along the line XVII-XVII in FIG. 1, and FIG. 18 corresponds to a cross-sectional view taken along the line XVIII-XVIII in FIG. 1.

The physical quantity sensor 1 according to the present embodiment is mainly the same as the physical quantity sensor 1 according to the first embodiment described above, except that the configuration of the sensor element 3 is different. In the following description, the physical quantity sensor 1 according to the second embodiment will be described focusing on differences from the first embodiment described above, and the description of the same matters will not be repeated. Further, in FIGS. 15 to 18, the same reference numerals are given to the same configurations as those of the first embodiment described above.

As shown in FIGS. 15 to 18, in the physical quantity sensor 1 according to the present embodiment, the lower surfaces of the sensor substrate 30 are in flush, and the upper surfaces of the first and second movable electrode fingers 64 and 69, the first and second fixed electrode fingers 44 and 49, and the springs 53 and 54 are individually shifted downward with respect to the upper surface of the other part. Even with such a configuration, the thickness h1 of the first and second movable electrode fingers 64 and 69, the thickness h3 of the first and second fixed electrode fingers 44 and 49, and the thickness h4 of the springs 53 and 54 each may be made smaller than the thickness h2 of the base part 50. Likewise, according to the second embodiment, the same effects as those of the first embodiment described above may be exhibited.

Third Embodiment

Figure 19:
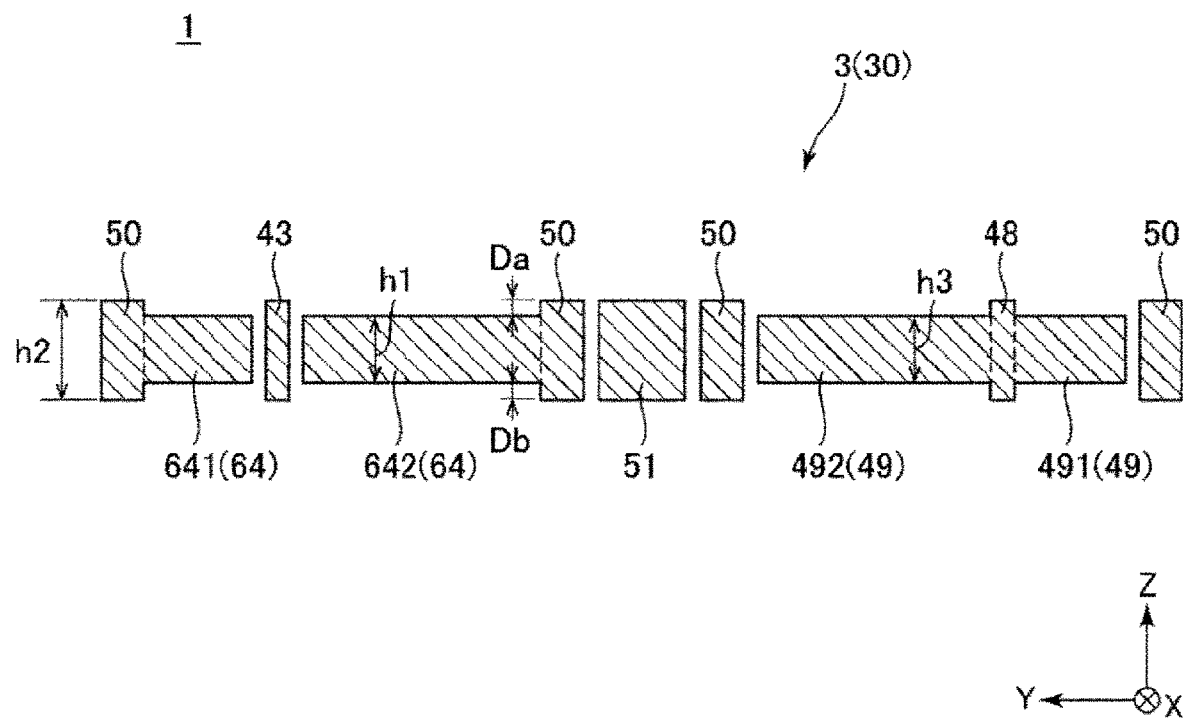
FIG. 19 is a cross-sectional view showing a physical quantity sensor according to a third embodiment of the present disclosure.
Figure 22:
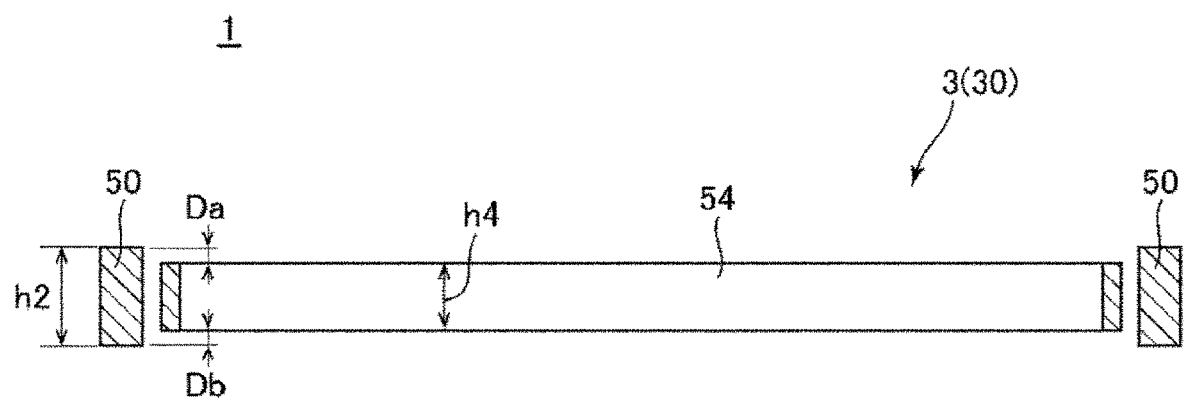
FIG. 22 is a cross-sectional view showing a physical quantity sensor according to the third embodiment of the present disclosure.

FIGS. 19 and 22 are cross-sectional views showing the physical quantity sensor according to the third embodiment.

Figure 20:
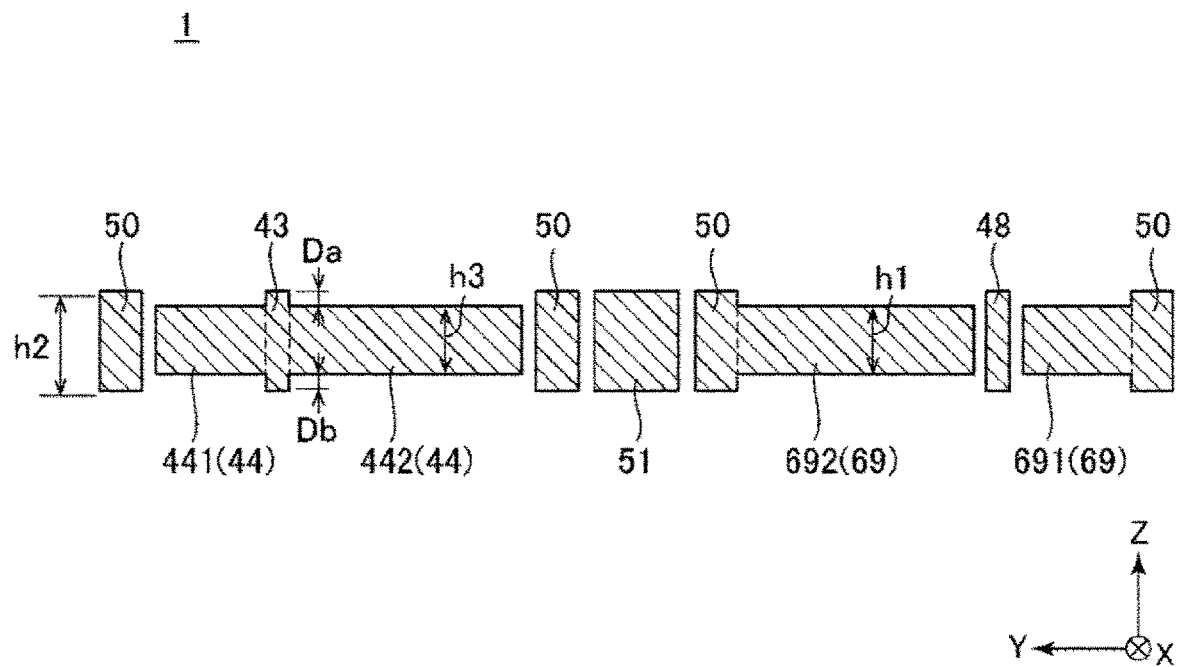
FIG. 20 is a cross-sectional view showing a physical quantity sensor according to the third embodiment of the present disclosure.
Figure 21:
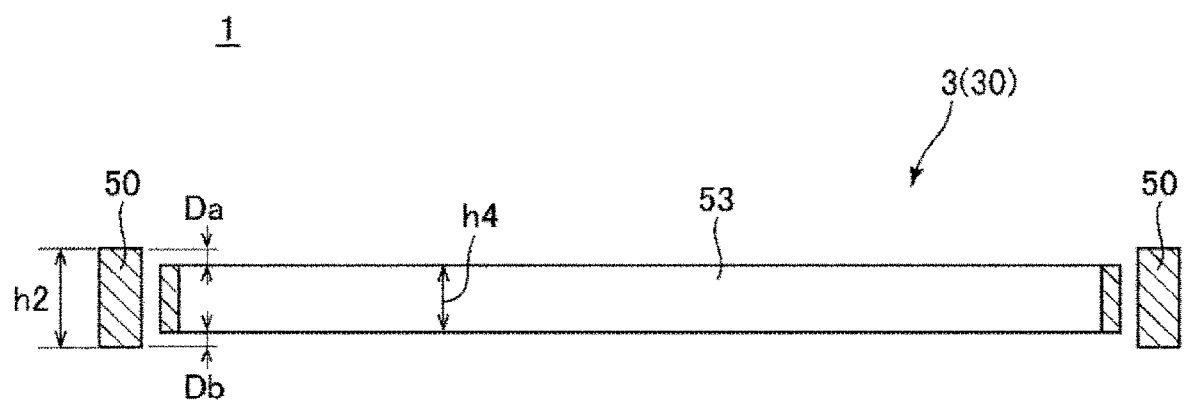
FIG. 21 is a cross-sectional view showing a physical quantity sensor according to the third embodiment of the present disclosure.

FIG. 19 corresponds to a cross-sectional view taken along the line XV-XV in FIG. 1, FIG. 20 corresponds to a cross-sectional view taken along the line XVI-XVI in FIG. 1, FIG. 21 corresponds to a cross-sectional view taken along the line XVII-XVII in FIG. 1, and FIG. 22 corresponds to a cross-sectional view taken along the line XVIII-XVIII in FIG. 1.

The physical quantity sensor 1 according to the present embodiment is mainly the same as the physical quantity sensor 1 according to the first embodiment described above, except that the configuration of the sensor element 3 is different. In the following description, the physical quantity sensor 1 according to the second embodiment will be described focusing on differences from the first embodiment described above, and the description of the same matters will not be repeated.

Further, in FIGS. 19 to 22, the same reference numerals are given to the same configurations as those of the first embodiment described above. As shown in FIGS. 19 to 22, in the physical quantity sensor 1 according to the present embodiment, the upper surfaces of the first and second movable electrode fingers 64 and 69, the first and second fixed electrode fingers 44 and 49, and the springs 53 and 54 are individually shifted downward with respect to the upper surface of the other part (hereinafter, also referred to as "upper main surface of the sensor substrate 30"), and the lower surfaces of the first and second movable electrode fingers 64 and 69, the first and second fixed electrode fingers 44 and 49, and the springs 53 and 54 are individually shifted upward with respect to the lower surface of the other part (hereinafter also referred to as "lower main surface of the sensor substrate 30"). In addition, the shifted amount Da of the upper surfaces of the first and second movable electrode fingers 64 and 69, the first and second fixed electrode fingers 44 and 49, and the springs 53 and 54 with respect to the upper main surface of the sensor substrate 30, and the shifted amount Db of the lower surfaces of the first and second movable electrode fingers 64 and 69, the first and second fixed electrode fingers 44 and 49, and the springs 53 and 54 with respect to the lower main surface of the sensor substrate 30 are equal to each other. As a result, the sensor element 3 has a vertically symmetrical shape, and has an excellent weight balance. Therefore, the movable part 52 is displaced more smoothly with respect to the substrate 2 and the measurement sensitivity for the acceleration Ax of the physical quantity sensor 1 is further enhanced. However, the shifted amounts Da and Db may be different from each other.

Likewise, according to the third embodiment, the same effect as that of the first embodiment described above may be exhibited.

Fourth Embodiment

Figure 23:
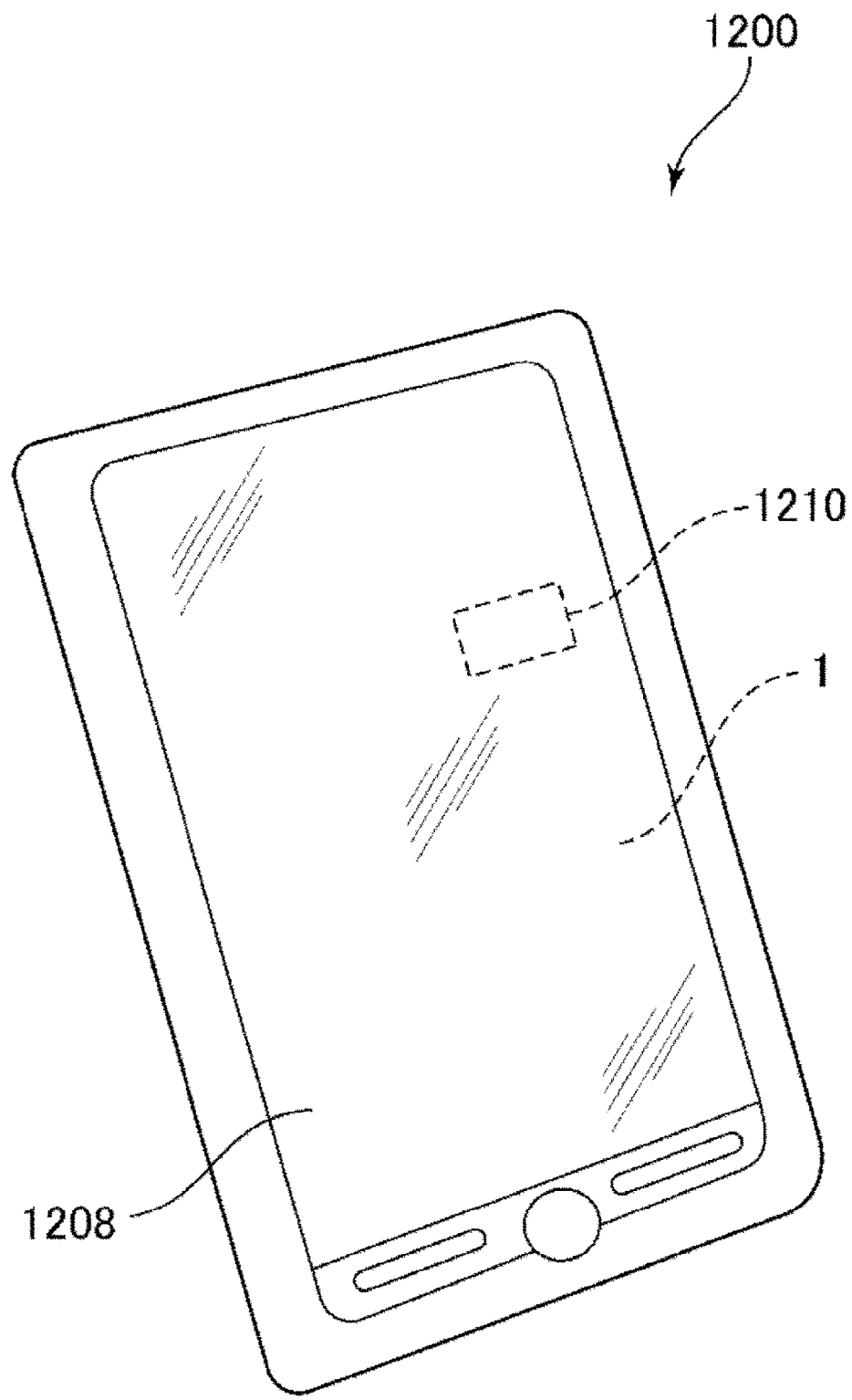
FIG. 23 is a plan view showing a smartphone as an electronic apparatus according to a fourth embodiment of the present disclosure.

FIG. 23 is a plan view showing a smartphone as an electronic apparatus according to the fourth embodiment.

The smartphone 1200 shown in FIG. 23 is an application of the electronic apparatus of the present disclosure. The smartphone 1200 incorporates the physical quantity sensor 1 and a control circuit 1210 that performs control based on a measurement signal output from the physical quantity sensor 1. Measurement data measured by the physical quantity sensor 1 may be transmitted to the control circuit 1210, and the control circuit 1210 may recognize the attitude and behavior of the smartphone 1200 from the received measurement data, and change a display image displayed on a display unit 1208, emit a warning sound or a sound effect, or drive a vibration motor to vibrate the main body.

The smartphone 1200 as such an electronic apparatus includes the physical quantity sensor 1. Therefore, the effects of the physical quantity sensor 1 described above may be obtained, and high reliability may be exhibited.

The electronic apparatus may be applied to, in addition to the smartphone 1200 described above, for example, personal computer, digital still camera, tablet terminal, watch, smart watch, inkjet printer, laptop personal computer, television, wearable terminal such as head mounted display (HMD), video camera, video tape recorder, car navigation device, pager, electronic organizer, electronic dictionary, calculator, electronic game machine, word processor, workstation, videophone, television monitor for crime prevention, electronic binoculars, POS terminal, medical equipment, fish finders, various measuring devices, devices for vehicle terminal base stations, various instruments for automobiles, aircrafts, ships, and the like, flight simulators, network servers, and the like.

Fifth Embodiment

Figure 24:
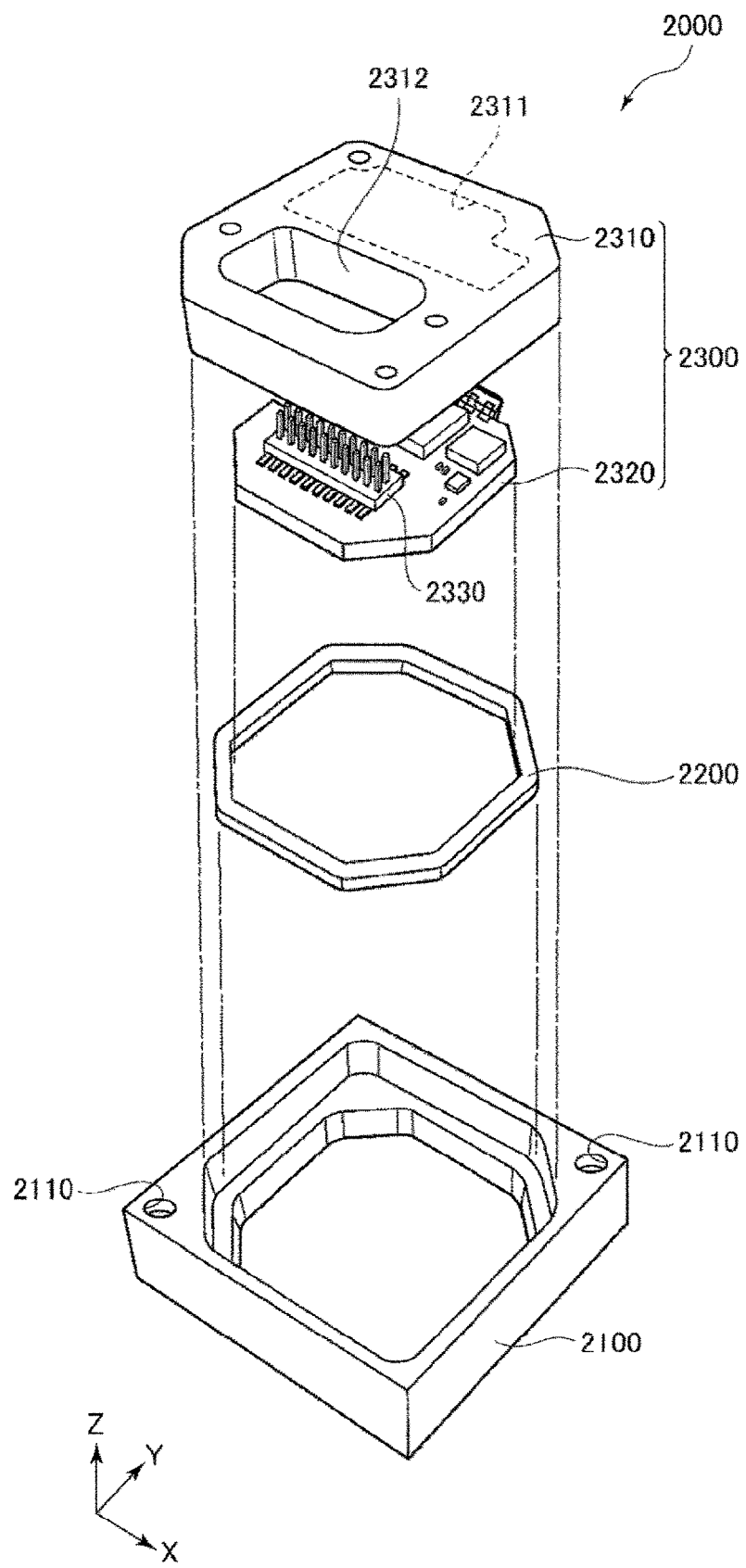
FIG. 24 is an exploded perspective view showing an inertial measurement device as an electronic apparatus according to a fifth embodiment of the present disclosure.
Figure 25:
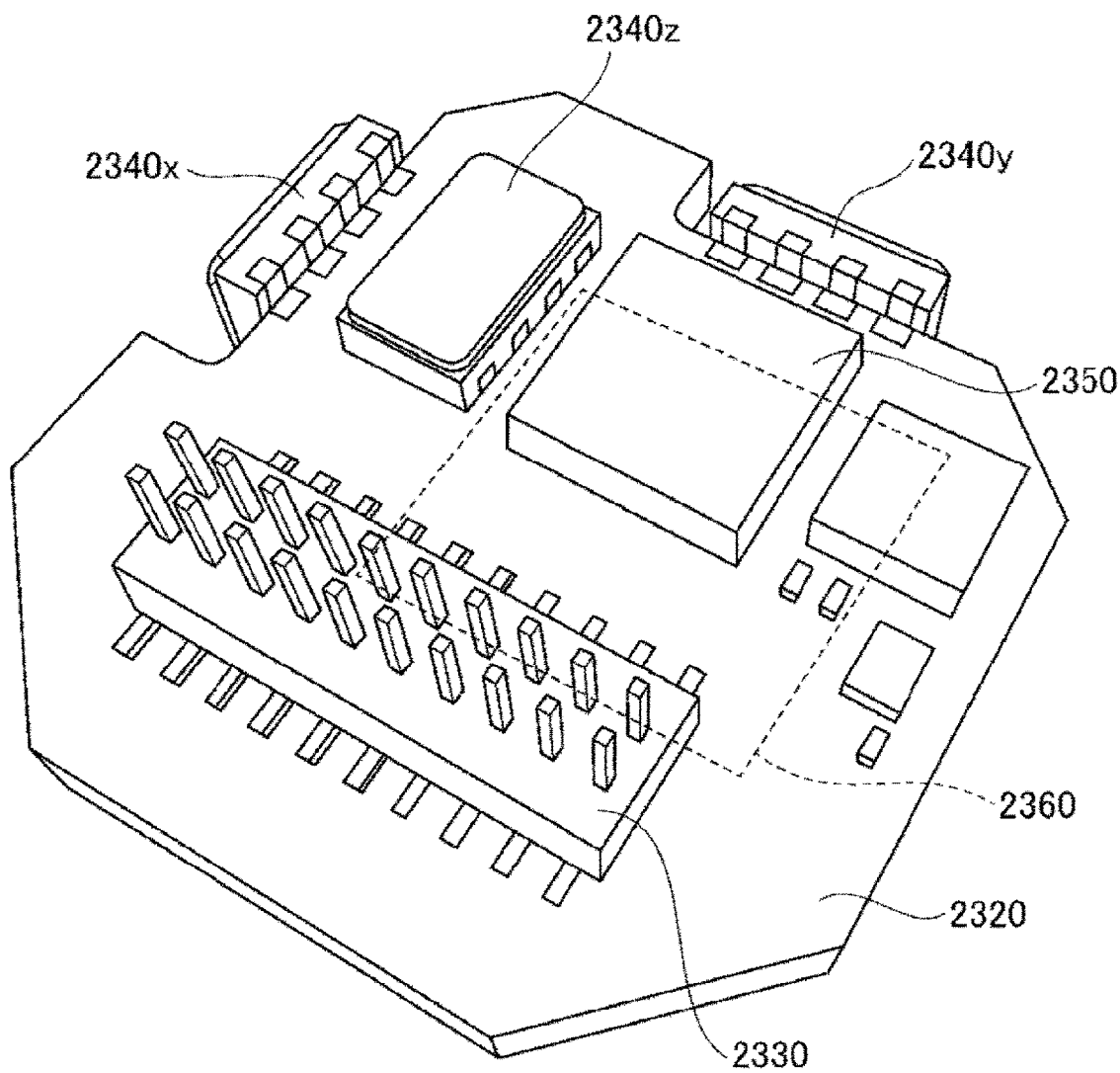
FIG. 25 is a perspective view of a substrate included in the inertial measurement device shown in FIG. 24.

FIG. 24 is an exploded perspective view showing an inertial measurement device as an electronic apparatus according to the fifth embodiment. FIG. 25 is a perspective view of a substrate included in the inertial measurement device shown in FIG. 24.

An inertial measurement device 2000 (Inertial Measurement Unit: IMU) as an electronic apparatus shown in FIG.

24 is an inertial measurement device that detects the posture or behavior of a mounted device such as an automobile or a robot. The inertial measurement device 2000 serves as a six axis motion sensor including a three axis acceleration sensor and a three axis angular velocity sensor.

The inertial measurement device 2000 is a rectangular parallelepiped having a substantially square planar shape. In addition, screw holes 2110 as a fixed portion are formed in the vicinity of two apexes located in the diagonal direction of the square. The inertial measurement device 2000 may be fixed to a mounting surface of a mount object such as an automobile by passing two screws through the two screw holes 2110. In addition, it may also be miniaturized to a size that maybe mounted, for example, on a smartphone or a digital camera by selecting parts or changing the design. The inertial measurement device 2000 includes an outer case 2100, a bonding member 2200, and a sensor module 2300, and has a configuration in which the sensor module 2300 is inserted inside the outer case 2100 with a bonding member 2200 interposed therebetween. Likewise the overall shape of the inertial measurement device 2000 described above, the outer shape of the outer case 2100 is a rectangular parallelepiped having a substantially square planar shape and includes screw holes 2110 formed in the vicinity of two apexes located in the diagonal direction of the square. In addition, the outer case 2100 is box-shaped, inside which the sensor module 2300 is stored.

The sensor module 2300 includes an inner case 2310 and a substrate 2320. The inner case 2310 is a member that supports the substrate 2320 and has a shape that fits inside the outer case 2100. In the inner case 2310, a depressed portion 2311 for preventing contact with the substrate 2320 and an opening 2312 for exposing a connector 2330 described below are formed. Such an inner case 2310 is bonded to the outer case 2100 through a bonding member 2200. Further, a substrate 2320 is bonded to the lower surface of the inner case 2310 with an adhesive.

As shown in FIG. 25, on the upper surface of the substrate 2320, a connector 2330, an angular velocity sensor 2340z that measures an angular velocity around the Z axis, an acceleration sensor 2350 that measures acceleration in each axial direction of X, Y and Z axes, and the like are mounted. Further, on the side surface of the substrate 2320, an angular velocity sensor 2340x that measures an angular velocity around the X axis and an angular velocity sensor 2340y that measures an angular velocity around the Y axis are mounted. The physical quantity sensor according to the present disclosure may be used for each of these sensors 2340x, 2340y, 2340z, and 2350. Further, a control IC 2360 is mounted on the lower surface of the substrate 2320.

The control IC 2360 is a micro controller unit (MCU), and controls each part of the inertial measurement device 2000. The storage unit stores a program that defines the order and content for measuring acceleration and angular velocity, a program that digitizes measurement data and incorporates it into packet data, and accompanying data. A plurality of other electronic components are mounted on the substrate 2320.

Sixth Embodiment

Figure 26:
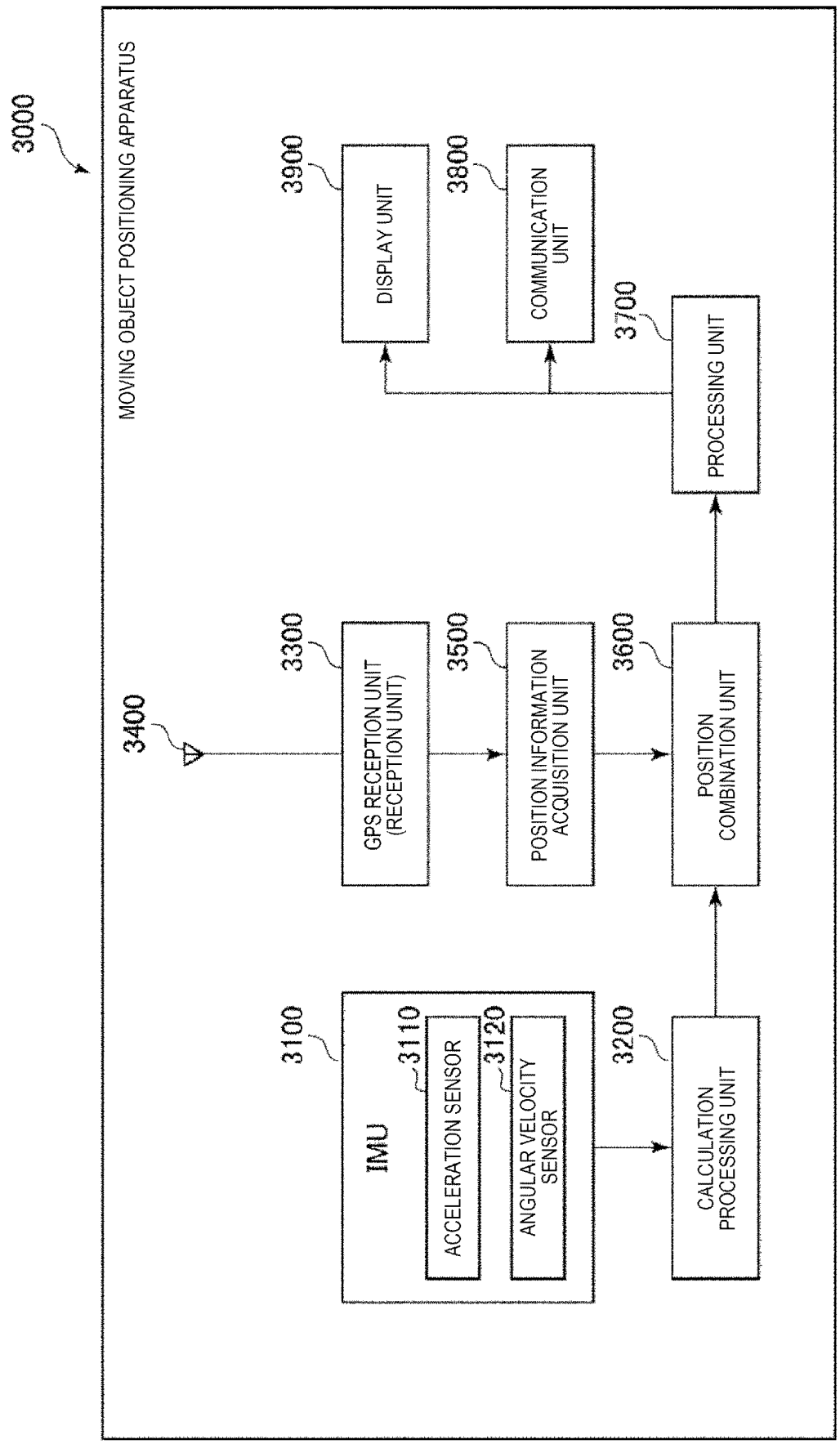
FIG. 26 is a block diagram showing an overall system of a vehicle positioning apparatus as an electronic apparatus according to a sixth embodiment of the present disclosure.
Figure 27:
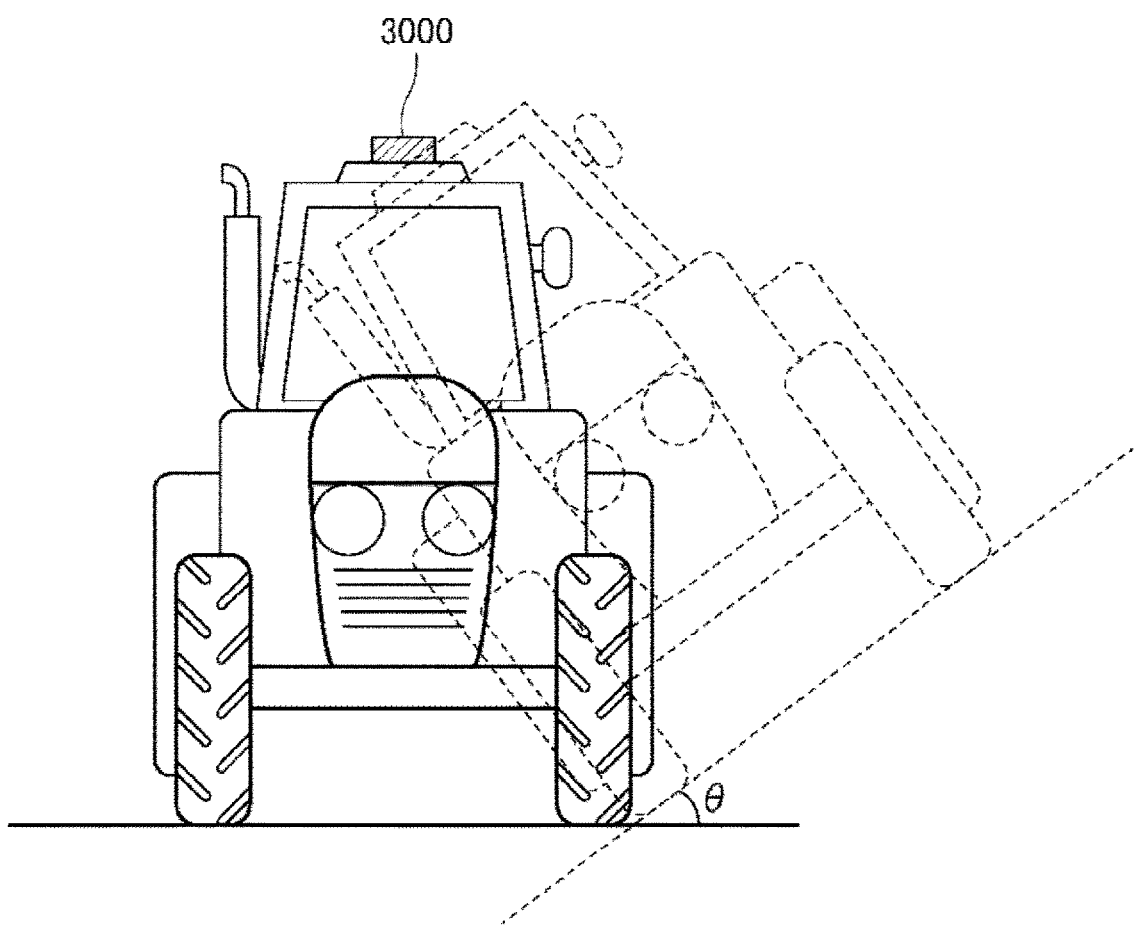
FIG. 27 is a view showing an operation of the vehicle positioning apparatus shown in FIG. 26.

FIG. 26 is a block diagram showing an entire system of a vehicle positioning apparatus as an electronic apparatus according to the sixth embodiment. FIG. 27 is a view showing the operation of the vehicle positioning apparatus shown in FIG. 26.

A vehicle positioning apparatus 3000 shown in FIG. 26 is a device mounted on a vehicle and used to perform the positioning of the vehicle. The vehicle is not particularly limited, and may be any of a bicycle, an automobile, a motorcycle, a train, an airplane, a ship, and the like, and in the present embodiment, a case where a four-wheel automobile is used as the vehicle will be described.

The vehicle positioning apparatus 3000 includes an inertial measurement device 3100 (IMU), an calculation processing unit 3200, a GPS reception unit 3300, a reception antenna 3400, a position information acquisition unit 3500, a position combination unit 3600, a processing unit 3700, a communication unit 3800, and a display unit 3900. For the inertial measurement device 3100, the inertial measurement device 2000 described above may be used, for example.

The inertial measurement device 3100 includes a three axis acceleration sensor 3110 and a three axis angular velocity sensor 3120. The calculation processing unit 3200 receives acceleration data from the acceleration sensor 3110 and angular velocity data from the angular velocity sensor 3120, performs inertial navigation arithmetic processing on these data, and outputs inertial navigation positioning data including the acceleration and attitude of the vehicle.

In addition, the GPS reception unit 3300 receives a signal from a GPS satellite through the reception antenna 3400. Further, based on the signal received by the GPS reception unit 3300, the position information acquisition unit 3500 outputs GPS positioning data representing the position (latitude, longitude, altitude), velocity, and orientation of the vehicle positioning apparatus 3000. The GPS positioning data also includes status data indicating a reception state, a reception time, and the like.

The position combination unit 3600 calculates the position of the vehicle, or specifically, calculates on which position on the ground the vehicle is traveling, based on the inertial navigation positioning data output from the calculation processing unit 3200 and the GPS positioning data output from the position information acquisition unit 3500. For example, even when the position of the vehicle included in the GPS positioning data is the same, as shown in FIG. 27, when the posture of the vehicle is different due to the influence of the inclination of the ground and the like, the vehicle is traveling at different positions on the ground. Therefore, it is not possible to calculate the accurate position of the vehicle using GPS positioning data alone. Therefore, the position combination unit 3600 uses the inertial navigation positioning data to calculate which position on the ground the vehicle is traveling.

The position data output from the position combination unit 3600 is subjected to predetermined processing by the processing unit 3700, and displayed on the display unit 3900 as a positioning result. The position data may be transmitted to the external device by the communication unit 3800.

Seventh Embodiment

Figure 28:
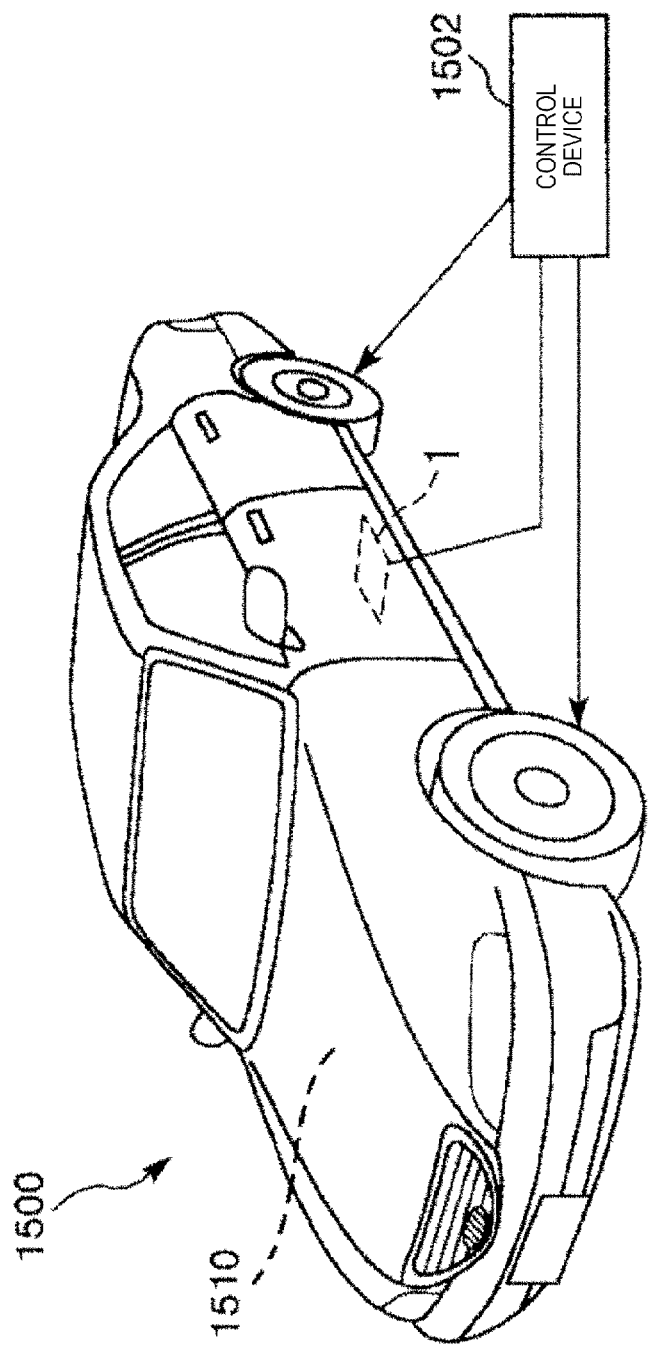
FIG. 28 is a perspective view showing a vehicle according to a seventh embodiment of the present disclosure.

FIG. 28 is a perspective view showing a vehicle according to the seventh embodiment.

An automobile 1500 shown in FIG. 28 is an automobile to which the vehicle according to the present disclosure is applied. In this drawing, the automobile 1500 includes at least one system 1510 of an engine system, a brake system and a keyless entry system. Further, the physical quantity sensor 1 is built in the automobile 1500, and the posture of the vehicle body 1501 may be measured by the physical quantity sensor 1. The measurement signal of the physical quantity sensor 1 is supplied to the control device 1502, and the control device 1502 may control the system 1510 based on the signal.

As described above, the automobile 1500 as a vehicle includes the physical quantity sensor 1. Therefore, the effects of the physical quantity sensor 1 described above may be obtained, and high reliability may be exhibited.

In addition, the physical quantity sensor 1 may be widely applied to a vehicle navigation system, a vehicle air conditioner, an antilock brake system (ABS), an air bag, a tire pressure monitoring system (TPMS), an engine controller, and an electronic control unit (ECU) such as battery monitors of a hybrid automobile or an electric automobile. In addition, the vehicle is not limited to the automobile 1500, and may be applied to, for example, airplanes, rockets, artificial satellites, ships, unmanned transport vehicles (AGV), biped robots, unmanned airplanes such as drone, and the like.

Although the physical quantity sensor, the electronic apparatus, and the vehicle according to the present disclosure have been described above based on the embodiments illustrated so far, the present disclosure is not limited thereto, and the configuration of each part may be replaced by any configuration having the same function. In addition, any other component may be added to the present disclosure. In addition, the embodiments described above may be combined as appropriate.

In the embodiment described above, an acceleration sensor that detects acceleration as a physical quantity sensor has been described, but the physical quantity measured by the physical quantity sensor is not limited to acceleration, and may be angular velocity, pressure, and the like, for example.

What is claimed is:

1. A physical quantity sensor comprising:
   a substrate of which a thickness direction is in a direction along a Z axis, when three axes orthogonal to one another are taken as an X axis, a Y axis, and the Z axis; and
   a sensor element provided on the substrate to measure a physical quantity,
   wherein the sensor element includes
   a movable part which displaces in a direction along the X axis that is an axis for measuring the physical quantity with respect to the substrate, and
   a fixed electrode fixed to the substrate, and
   the movable part includes
   a movable electrode disposed to face the fixed electrode in the direction along the X axis, and
   a mass portion that supports the movable electrode and has a longer length than the movable electrode in the direction along the Z axis,
   the movable part comprising a frame shape that surrounds the fixed electrode and includes a base portion comprising the mass portion, the base portion supporting the moveable electrode.

2. The physical quantity sensor according to claim 1, wherein the mass portion has a longer length than the fixed electrode along the Z axis direction.

3. The physical quantity sensor according to claim 2, wherein the movable electrode and the fixed electrode have equal lengths along the Z axis direction.

4. The physical quantity sensor according to claim 1, wherein the sensor element includes
   a fixed portion fixed to the substrate, and
   a spring that connects the fixed portion and the movable part.

5. The physical quantity sensor according to claim 4, wherein the spring has a length shorter than the mass portion in the direction along the Z axis direction.

6. The physical quantity sensor according to claim 1, wherein the fixed electrode includes
   a first fixed electrode and a second fixed electrode disposed side by side in a direction along the Y axis,
   the first fixed electrode includes
   a first trunk portion, and
   a plurality of first fixed electrode fingers extending from the first trunk portion to both sides in the direction along the Y axis, and
   the second fixed electrode includes
   a second trunk portion, and
   a plurality of second fixed electrode fingers extending from the second trunk portion to both sides in the direction along the Y axis.

7. The physical quantity sensor according to claim 6, wherein each of the first trunk portion and the second trunk portion extends along an axis inclined with respect to the X axis and the Y axis.

8. The physical quantity sensor according to claim 6, wherein the first trunk portion and the second trunk portion are line symmetrical with respect to the X axis.

9. The physical quantity sensor according to claim 6, wherein a plurality of the first fixed electrode fingers extending from the first trunk portion to a side of the second trunk portion, and a plurality of the second fixed electrode fingers extending from the second trunk portion to a side of the first trunk portion are disposed along the X axis, with a length in the Y axis direction gradually increasing toward one side in the direction along the X axis, and
   a plurality of the first fixed electrode fingers extending from the first trunk portion to a side opposite to the second trunk portion, and a plurality of the second fixed electrode fingers extending from the second trunk portion to a side opposite to the first trunk portion are disposed along the X axis, with a length in the Y axis direction gradually increasing toward the other side in the direction along the X axis.

10. The physical quantity sensor according to claim 9, wherein the movable electrode finger is located between a pair of the first fixed electrode fingers adjacent to each other in the X axis direction,
    a separation distance between one first fixed electrode finger and the movable electrode finger is different from a separation distance between the other first fixed electrode finger and the movable electrode finger,
    the movable electrode finger is located between a pair of the second fixed electrode fingers adjacent in the X axis direction, and
    a separation distance between one second fixed electrode finger and the movable electrode finger is different from a separation distance between the other second fixed electrode finger and the movable electrode finger.

11. An electronic apparatus comprising the physical quantity sensor according to claim 1.

12. A vehicle comprising the physical quantity sensor according to claim 1.

* * * * *